(12) United States Patent
Hashimoto

(10) Patent No.: US 6,885,456 B2
(45) Date of Patent: Apr. 26, 2005

(54) COMPACT OPTICAL GYROSCOPE AND METHOD OF MANUFACTURING THE SAME

(75) Inventor: Yasuharu Hashimoto, Hinamiminowa-Mura (JP)

(73) Assignee: Seiko Epson Corporation (JP)

( * ) Notice: Subject to any disclaimer, the term of this patent is extended or adjusted under 35 U.S.C. 154(b) by 209 days.

(21) Appl. No.: 10/208,266

(22) Filed: Jul. 30, 2002

(65) Prior Publication Data

US 2003/0053067 A1 Mar. 20, 2003

(30) Foreign Application Priority Data

Aug. 28, 2001 (JP) ........................................ 2001-258210

(51) Int. Cl.$^7$ ............................................. G01C 19/72
(52) U.S. Cl. ..................................................... 356/465
(58) Field of Search ................................ 356/459, 460, 356/464, 465; 385/12

(56) References Cited

U.S. PATENT DOCUMENTS

| | | | | |
|---|---|---|---|---|
| 4,120,588 A | * | 10/1978 | Chaum | ........................ 356/460 |
| 4,273,445 A | | 6/1981 | Thompson et al. | |
| 4,299,490 A | * | 11/1981 | Cahill et al. | ................. 356/464 |
| 4,915,503 A | | 4/1990 | Pavlath | |
| 5,781,301 A | * | 7/1998 | Ruffin | ........................ 356/465 |
| 6,587,205 B2 | * | 7/2003 | Goldner et al. | ............. 356/465 |

FOREIGN PATENT DOCUMENTS

| | | |
|---|---|---|
| EP | 0483993 A2 | 10/1991 |
| JP | 61-184417 | 8/1986 |
| JP | 64-064283 | 3/1989 |
| JP | 03-142317 | 6/1991 |
| JP | 04-265816 | 9/1992 |
| JP | 06-050764 | 2/1994 |
| JP | 08-285611 | 11/1996 |

OTHER PUBLICATIONS

International Search Report for counterpart PCT application No. PCT/JP02/06918.

* cited by examiner

*Primary Examiner*—Samuel A. Turner
(74) *Attorney, Agent, or Firm*—Harness, Dickey & Pierce, P.L.C.

(57) ABSTRACT

An optical gyroscope (100) has a detection light guide body (100S) and a light measuring board (140). The detection light guide body (100S) is formed by stacking light guide layers (110, 120) and protective layers (130) alternately. An eddy-shaped light guide path section is provided in each of the light guide layers (110, 120), and the light guide path sections are optically connected to each other through said protective layers (130) to form an integral light guide path (100L). One end (100La) of the light guide path (100L) is directly connected to the light measuring board (140), and another end (100Lb) of the same is connected to the light measuring board (140) through an optical fiber (143).

34 Claims, 18 Drawing Sheets

FIG. 5
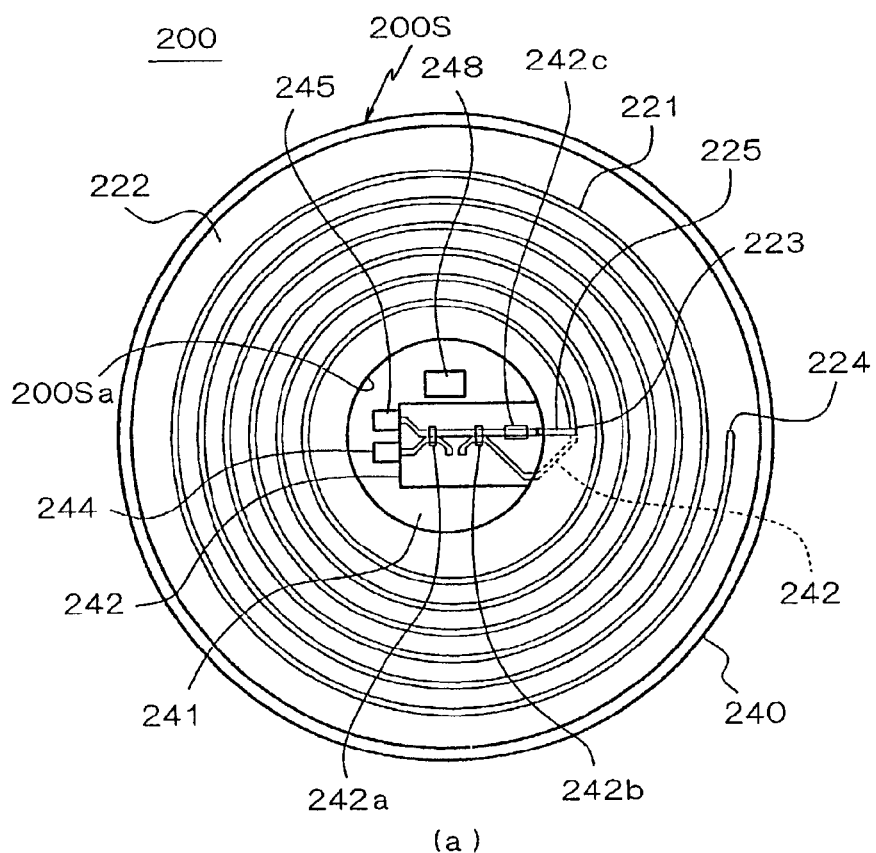
(a)
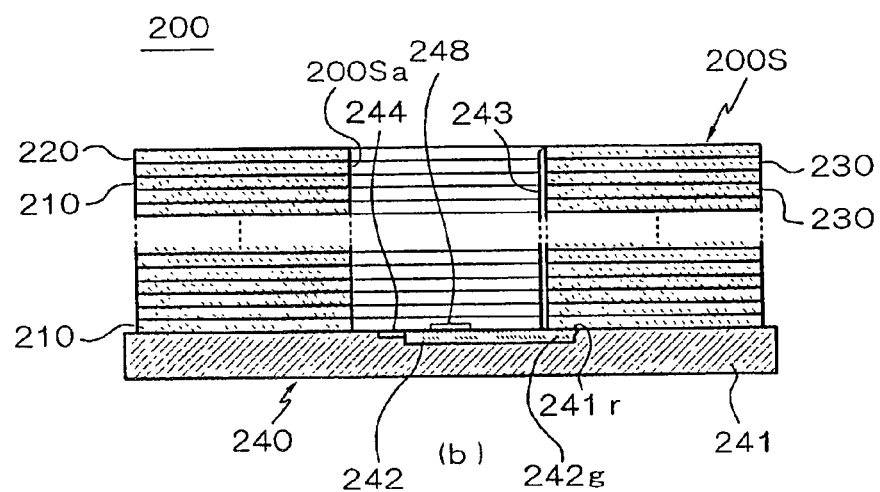
(b)

COMPACT OPTICAL GYROSCOPE AND METHOD OF MANUFACTURING THE SAME

TECHNICAL FIELD

The present invention relates to an optical gyroscope and a method of manufacturing the same and, more particularly, to a stereoscopic configuration that is preferable as a structure of a sensing section such as a detection coil for detecting a rotary motion.

BACKGROUND ART

In general, rotating wheel type or mechanical type gyroscopes have been used for many years as gyroscopes. However, gyroscopes of this type have had problems in that component costs are high because of extremely high requirements on accuracy of their shapes and in that their durability is insufficient because of the presence of mechanically sliding sections.

In order to solve the above problems, optical gyroscopes having a configuration for optically detecting attitude changes have been proposed. An optical gyroscope normally takes advantage of the Sagnac effect that is a phase difference generated between two light waves propagated in a closed optical loop in directions opposite to each other, the phase difference being proportionate to the rotation. Referring to types of optical gyroscopes, there is an interference type in which interference between two light waves is measured as described above, a resonance type in which an optical ring resonator having high fineness is configured to measure changes in an optical resonance frequency attributable to the Sagnac effect, and a ring laser type in which a laser is configured using simulated Brillouin scattered light that is generated in a fiber by incident light having high power.

Various optical gyroscopes have been proposed, including those which use a gas laser, a semiconductor laser or a light-emitting diode as a light source depending on the materials of which they are made up and those which use an optical resonator or optical fiber to form an optical loop.

Referring to specific examples of the prior art, for example, Japanese Patent Publication No. 27194/1996 has disclosed an interference type optical fiber gyroscope having a detection coil constituted by an optical fiber. Japanese Patent Laid-Open No. 288556/1993 has disclosed a semiconductor laser gyro in which a ring resonator is formed on a semiconductor substrate having a p-n junction; laser oscillation is caused by injecting a carrier from an electrode in an overlapping relationship with the ring resonator; and interference signal between two light waves emitted by the ring resonator is detected by an electrode that is provided separately.

However, in the case of an interference type gyroscope such as the optical fiber gyroscope disclosed on the above-cited Japanese Patent Publication No. 27194/1996, since it must have a great optical path length (which may range from several meters to several kilometers), a problem arises in that a detecting section has great dimensions even if an optical fiber is used. In particular, an optical fiber occupies a considerably great volume as a whole because it has protective layers called clads formed around a core that constitutes a light guide path. Therefore, it is very difficult to form with small dimensions suitable for applications including use in vehicles or portable apparatus.

In the case of an apparatus having a ring resonator such as the semiconductor laser gyro disclosed in the above-cited Japanese Patent Laid-Open No. 288556/1993, there is a problem in that frequency locking referred to as lock-in occurs at a low angular velocity to disable detection of rotation.

The invention solves the above-described problems, and it is an object of the invention to provide an optical gyroscope that is smaller than those in the prior art. There is also provided a compact optical gyroscope capable of detection at a low angular velocity without any problem.

SUMMARY OF THE INVENTION

In order to solve the above problems, an optical gyroscope according to the invention is an optical gyroscope having a light source, a detection light guide body having a circular light guide path, and a photo detector for detecting light that has passed through said light guide path of said detection light guide body, characterized in that said detection light guide body has a plurality of light guide layers having circular light guide path sections and in that said light guide layers are stacked with said light guide path sections optically connected to each other.

According to the invention, since there is formed a light guide path in which the light guide layers having circular light guide path sections are stacked in the detection light guide body and in which the light guide path sections of the light guide layers are optically connected to each other, the volume of the apparatus can be smaller than that in the case of an optical fiber, and the light guide path sections can be finely configured. Since this makes it possible to configure a compact light guide path having a great optical path length in the detection light guide body, the gyroscope can be made small. Further, since a light guide path having a great optical path length can be configured in a compact detection light guide body as described above, there is no need for forming a ring resonator that may cause lock-in, which makes it possible to provide an optical gyroscope capable of measurement even at a low rotating speed without any problem.

Said light guide path sections are preferably formed in an eddy pattern. By forming the light guide path sections in an eddy pattern (in other words, a planar helical configuration or planar spiral configuration), the light guide paths can be formed in a high density unlike the prior art in which an optical fiber is simply wound, and this makes it possible to reduce the size of an optical gyroscope significantly.

Preferably, there is provided first light guide layers having said light guide path sections extending in an eddy pattern in a predetermined rotating direction from an inner end to an outer end and second light guide layers having said light guide path sections extending in an eddy pattern in said predetermined rotating direction from the outer end to the inner end, and said first light guide layers and said second light guide layers are alternately stacked. Since such means makes it possible to provide a configuration in which the first light guide layers and the second light guide layers are provided as light guide layers; the outer ends of the first light guide layers are optically connected to the outer ends of the second light guide layers; and the inner ends of the first light guide layers are optically connected to the inner ends of the second light guide layers, the size of the detection light guide body can be further reduced because volumetric requirements for the regions connecting the light guide layers can be reduced.

Further, it is preferable to provide an optical connecting section for optically connecting said light guide path sections of said light guide layers adjacent to each other. In this case, the optical connecting section may be provided between said light guide layers adjacent to each other or may be provided across outer circumferential portions or inner circumferential portions of said light guide layers adjacent to each other. When the optical connecting section is provided on the outer circumferential portions or inner circumferential portions of the light guide layers, the optical precision of the detection light guide body can be improved and manufacture is facilitated because matching of the optical connecting section can be easily checked from outside or because the optical connecting section can be provided after stacking the light guide layers. The optical connecting section may be provided integrally with the outer circumferential portions or inner circumferential portions of the light guide layers. Alternatively, the optical connecting section may be mounted on the outer circumferential portions or inner circumferential portions of the light guide layers.

According to the invention, said optical connecting section preferably includes a reflecting surface that is constituted by a surface of a metal layer. Since light can be reflected regardless of the incident angle by providing the reflecting surface constituted by a surface of a metal layer, it is possible to deflect light significantly and to suppress any increase in optical loss even in the case of a great deflection angle, and this makes it possible to configure the optical connecting section compactly and to suppress any reduction in detecting sensitivity.

According to the invention, as said reflecting surface, said optical connecting section preferably includes a first reflecting surface provided at an end of said light guide path section of one of said light guide layers and a second reflecting surface provided at an end of said light guide path section of the other of said light guide layers in a face-to-face relationship with said first reflecting surface. By providing the first reflecting surface and the second reflecting surface at the ends of the respective light guide path sections of the light guide layers adjacent to each other and providing those reflecting surfaces in a face-to-face relationship with each other, light can be reliably propagated from the light guide path section in one of the light guide layers to the light guide path section in the other light guide layer, which allows a further reduction of optical loss at the optical connecting section.

Said detection light guide body preferably has a protective material for covering said light guide path. This means makes it possible to protect the light guide path because the protective material for covering the light guide path is provided and to effectively entrap light in the light guide path through adjustment or selection of the optical characteristics of the protective material.

In this case, said protective material is preferably constituted by a material having a refractive index smaller than that of said light guide path. By forming it using a material having a refractive index smaller than that of the light guide path, light can be effectively entrapped by taking advantage of interfacial reflection at the interface between the light guide path and the protective material.

Another optical gyroscope according to the invention is an optical gyroscope having a light source, a detection light guide body having a circular light guide path, and a photo detector for detecting light that has passed through said light guide path of said detection light guide body, characterized in that said detection light guide body has a plurality of light guide layers having circular light guide path sections and protective layers including a protective material provided between a pair of said light guide layers adjacent to each other and in that the adjacent pair of said light guide layers are provided with said light guide path sections optically connected to each other through said protective layers.

According to the invention, since the light guide layers and the protective layers are alternately provided and are stacked such that the light guide path sections of the adjacent pair of light guide layers on both sides of the protective layers are optically connected through the protective layers, the detection light guide body can be more compactly configured than in the case where an optical fiber is used, and this makes it possible to reduce the size of an optical gyroscope.

Said light guide layers preferably have a protective material that is provided around said light guide path sections in a planar configuration. By providing the protective material in a planar configuration around the light guide path sections in the light guide layers, the light guide path sections can be protected even in the light guide layers, and light can be effectively entrapped in the light guide path sections by appropriately setting the quality of the protective material.

Said protective material is preferably configured such that it completely fills up gaps between said light guide path sections. Such a configuration makes it possible to reduce the influence of temperature changes on the light guide path such as dimensional changes and to achieve temperature characteristics significantly higher than those achievable using an optical fiber.

Further, said protective material is preferably formed from a material which has a refractive index smaller than that of said light guide path sections.

Said light guide path sections are preferably configured in an eddy pattern.

Preferably, said light guide layers have first light guide layers having said light guide path sections extending in an eddy pattern in a predetermined rotating direction from an inner end to an outer end thereof and second light guide layers having said light guide path sections extending in an eddy pattern in said predetermined rotating direction from an outer end to the inner end thereof, and said first light guide layers and said second light guide layers are alternately stacked through said protective layer. According to the invention, there is preferably provided an optical connecting section for optically connecting said light guide path sections of said light guide layers adjacent to each other.

Said optical connecting section is preferably provided between said light guide layers adjacent to each other.

Said optical connecting section is preferably provided across outer circumferential portions or inner circumferential portions of said light guide layers adjacent to each other.

Further, said optical connecting section preferably includes a reflecting surface constituted by a surface of a metal layer.

As said reflecting surface, said optical connecting section preferably includes a first reflecting surface provided at an end of said light guide path section of one of said light guide layers and a second reflecting surface provided at an end of said light guide path section of the other of said light guide layers in a face-to-face relationship with said first reflecting surface.

Still another optical gyroscope according to the invention in an optical gyroscope having a light source, a detection light guide body having a circular light guide path, and a photo detector for detecting light that has passed through said light guide path of said detection light guide body, characterized in that said detection light guide body has a plurality of light guide layers having circular light guide path sections that are formed in an annular region and in that said light guide layers are alternately stacked with said light guide path sections optically connected to each other.

Since problems including a reduction in the light entrapping effect occur when the radius of curvature of the light guide path sections is somewhat small relative to the width of the light guide path, the region where the light guide path sections are formed is formed in an annular configuration, which makes it possible to limit any reduction in the radius of curvature of the light guide path sections.

In this case, it is preferable to provide an opening, in particular, at the center of the light guide layers. By forming the light guide layers with a configuration (e.g., an annular configuration) having an opening at the center thereof, it is possible to provide other components such as the light source and the photo detector in the opening, which makes it possible to configure the optical gyroscope more compactly.

Said light source and said photo detector are preferably provided closer to the center than the region where said light guide path sections are formed as viewed on the plane thereof. This makes it possible to make the optical gyroscope more compact. The statement that they are provided closer to the center as viewed on the plane thereof means that they are located closer to the center (inside) than the region where the light guide path sections are formed when projected on the plane on which said light guide layers are formed.

There may be provided an optical circuit that determines optical interactions between said light source and said photo detector and said detection light guide body.

In this case, said optical circuit is preferably provided closer to the center than the region where said light guide path section is formed on the plane thereof. This makes it possible to make the optical gyroscope more compact. The statement that they are provided closer to the center as viewed on the plane thereof means that they are located closer to the center (inside) than the region where the light guide path section is formed when projected on the plane on which said light guide layers are formed.

The invention of the present application is preferably applied to an interference type optical gyroscope in which two light waves traveling in direction opposite to each other are introduced into a circular light guide path as described above to somehow detect interference between the light waves. In such an interference type optical gyroscope, the light path length of the light guide path may be as great as several kilometers, and compactness achieved by the invention is significantly advantageous in such a case. However, a resonance type optical gyroscope may also require a light path length ranging from several meters to several tens meters, and the invention of the present application is quite advantageous also in such a case.

A method of manufacturing an optical gyroscope according to the invention is a method of manufacturing an optical gyroscope having a light source, a detection light guide body having a circular light guide path, and a photo detector for detecting light that has passed through said light guide path of said detection light guide body, characterized in that it includes the step of forming said detection light guide body by alternately stacking a plurality of light guide layers having circular light guide path sections such that said light guide path sections are optically connected to each other.

According to the invention, the step of forming said detection light guide body preferably includes the step of forming said light guide path in which said light guide path sections are optically connected across a plurality of layers and the step of filling a protective material around said light guide path. By filling the protective material after forming the light guide path, a need for an assembly step is eliminated, and even a fine structure can be relatively easily configured.

According to the invention, at the step of forming said light guide path, said light guide path is preferably formed using an optical shaping process. By forming the light guide path using an optical shaping process, even a light guide path having a complicated configuration can be easily formed.

According to the invention, the step of forming said detection light guide body preferably includes the step of forming a plurality of said light guide layers having said light guide path sections and the step of alternately stacking said light guide layers such that said light guide path sections are optically connected to each other. The detection light guide body is configured by forming the light guide layers and then stacking them, which makes it possible to achieve a reduction in manufacturing cost because each light guide layer can be easily formed.

According to the invention, at the step of forming said light guide layers, said light guide path sections are preferably formed using an optical shaping process. The use of an optical shaping process makes it possible to form the complicated configuration of the light guide path sections such as an eddy configuration.

According to the invention, at the step of forming said light guide layers, it is preferable to form a wound body by winding a light guide sheet for forming said light guide path sections and a protective sheet constituted by a protective material in an overlapping relationship and to form said light guide layers by dividing said wound body in the axial direction thereof. A reduction in manufacturing cost can be achieved by forming the light guide layers by dividing the wound body formed by winding the light guide sheet and the protective sheet in an overlapping relationship.

According to the invention, at the step of stacking said light guide layers, a plurality of said light guide layers is preferably stacked with protective layers constituted by a protective material interposed therebetween.

According to the invention, said protective material is preferably a material having a refractive index smaller than that of said light guide path sections.

BRIEF DESCRIPTION OF THE DRAWINGS

FIG. 5 is a schematic plan view (a) and a schematic front sectional view (b) showing a general configuration of an optical gyroscope 200 in a second mode for carrying out the invention;

BEST MODES FOR CARRYING OUT THE INVENTION

Preferred embodiments of an optical gyroscope according to the invention will now be described with reference to the accompanying drawings.

[First Embodiment of the Invention]

Figure 1:
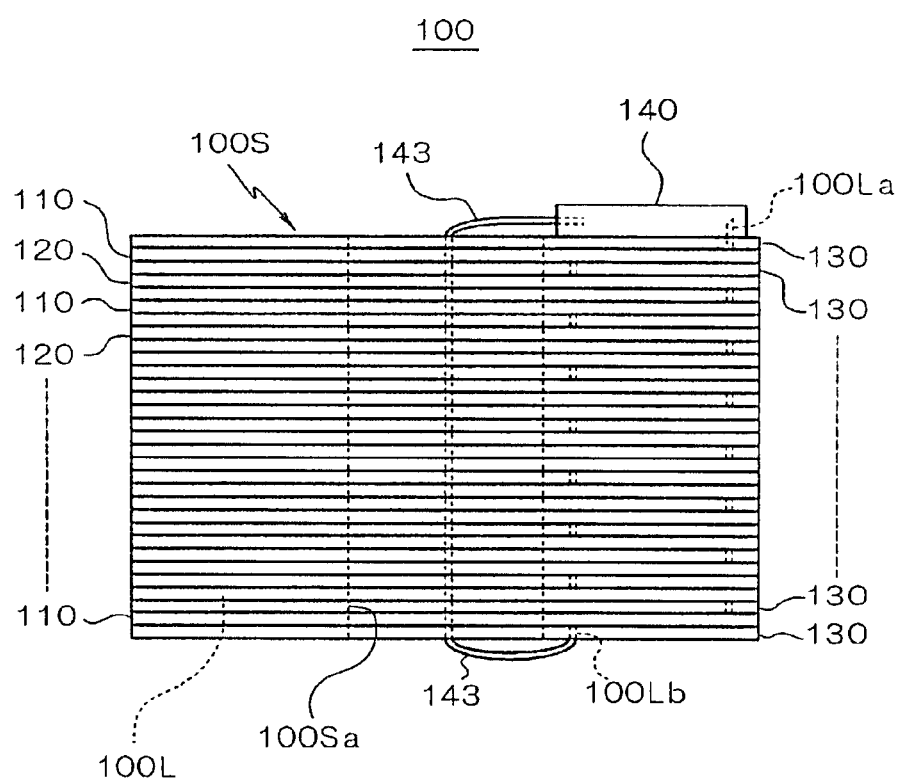
FIG. 1 is a schematic front vie showing a general configuration of an optical gyroscope 100 in a first mode for carrying out the invention.
Figure 2:
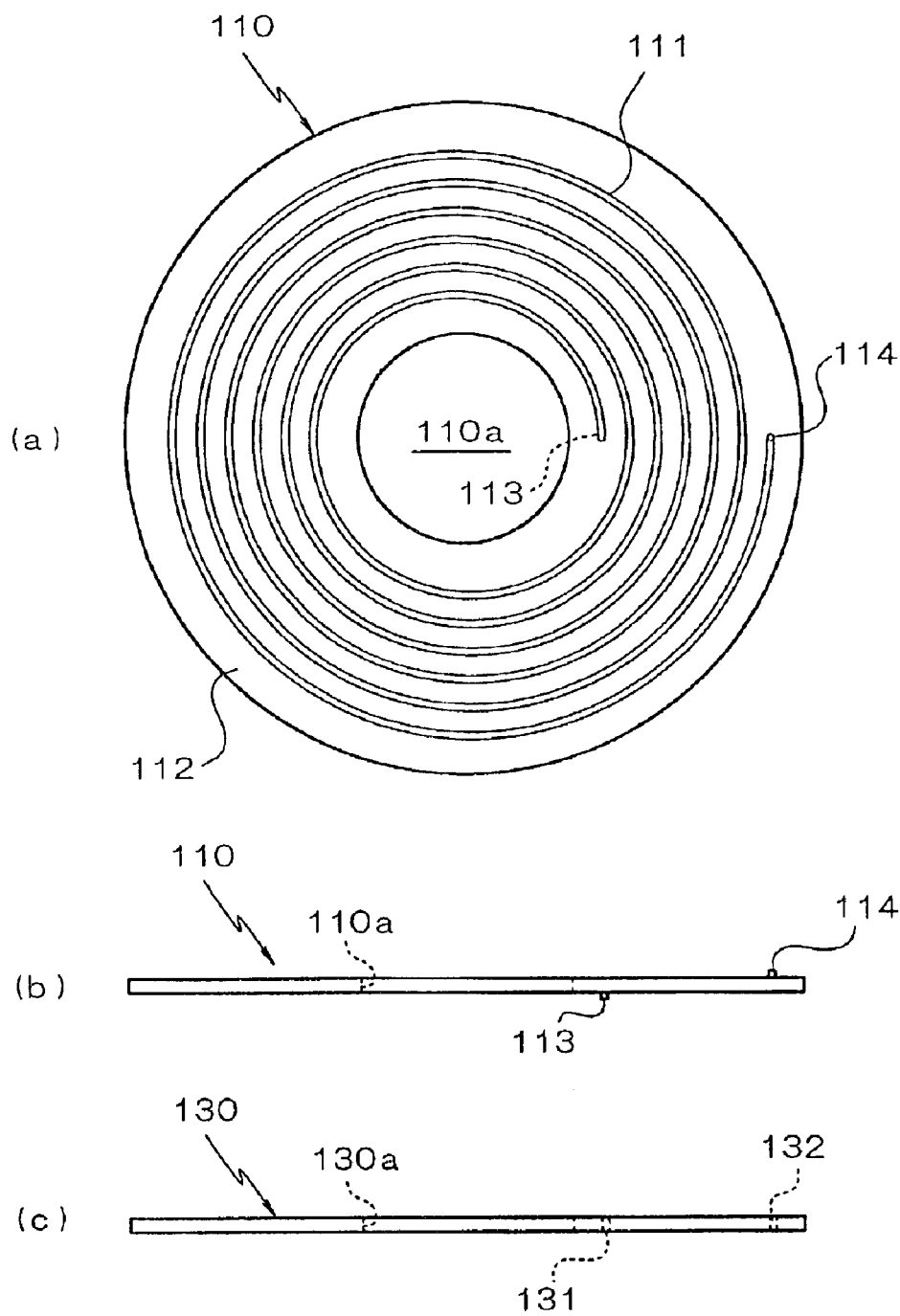
FIG. 2 is a plan view (a) and a front view (b) of a light guide layer 110 in a detection light guide body 100S forming a part of the optical gyroscope 100 and a front view (c) of a protective layer 130.
Figure 3:
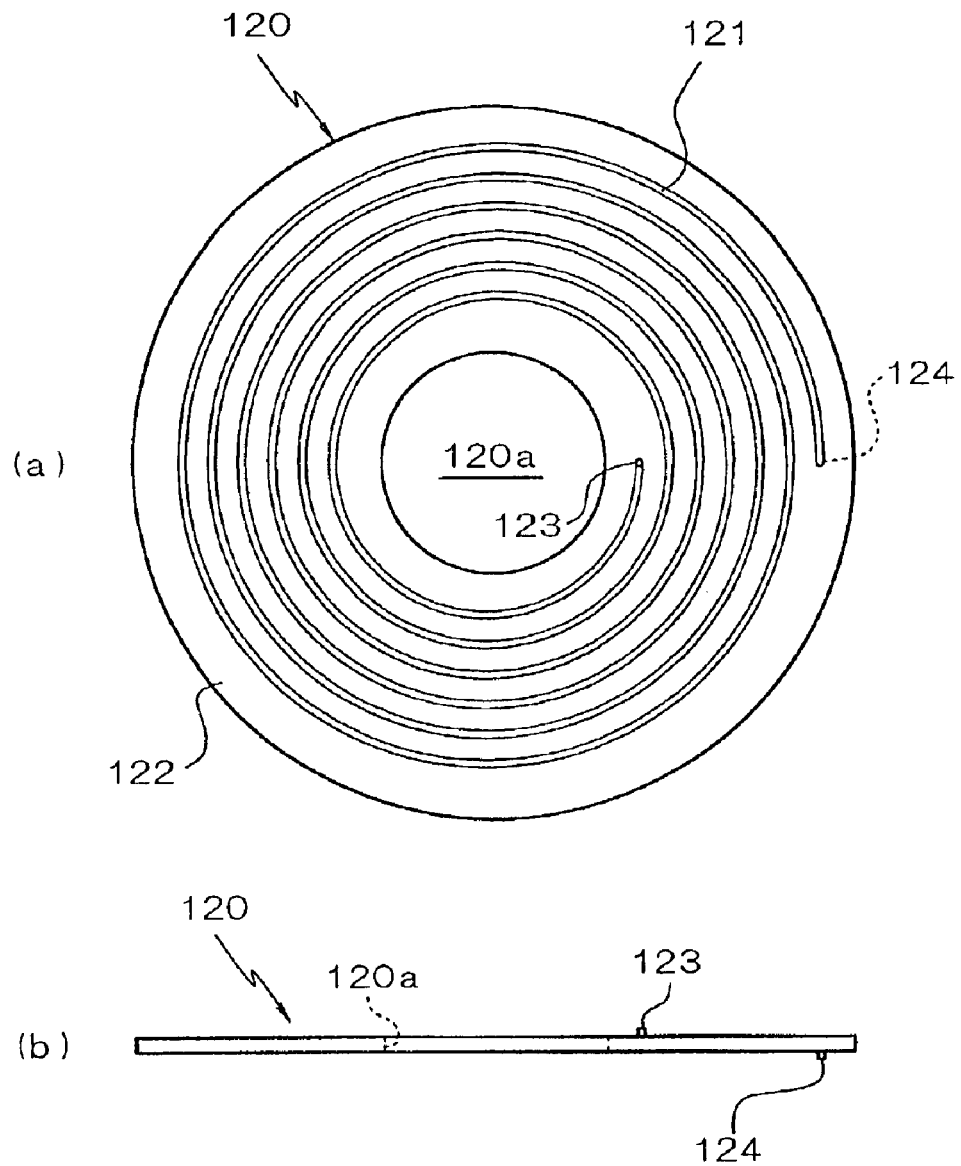
FIG. 3 is a plan view (a) and a front view (b) of a light guide layer 120 in the detection light guide body 100S forming a part of the optical gyroscope 100.

FIG. 1 is a front view of an optical gyroscope 100 of a first embodiment; FIG. 2 is a plan view (a) and a front view (b) of a light guide layer 110 that is one of elements of the optical gyroscope 100 and a front view (c) of a protective layer 130; and FIG. 3 is a plan view (a) and a front view (b) of a light guide layer 120 that is one of the elements of the optical gyroscope 100.

The optical gyroscope 100 has a detection light guide body 100S in which light guide layers 110 and light guide layers 120 are alternately stacked with protective layers 130 interposed therebetween. The detection light guide body 100S is formed in a cylindrical configuration as a whole, and a through hole 100Sa is provided in the middle of the same. A light guide path 100L having two ends 100La and 100Lb is formed inside the detection light guide body 100S, and one end 100La of the light guide path 100L protrudes from the top of the detection light guide body 100S and is connected to a light measuring board 140. The other end 100Lb protrudes from the bottom of the detection light guide body 100S and is connected to said light measuring board 140 through an optical fiber 143. The optical fiber 143 extends through the through hole 100Sa of the detection light guide body 100S to connect the other end 100Lb and the light measuring board 140 to each other.

As shown in FIG. 2(a), a light guide layer 110 has a light guide path section 111 formed in an eddy pattern (that is, a helical or spiral configuration drawn on a plane) and a protective material 112 formed to fill up regions of the plane where the light guide section 111 is not formed, and the layer is formed like a holed plate having an opening 110a in the middle thereof (a holed disk in the illustrated example). The light guide path section 111 forms a part of said light guide path 100L, and it is configured such that it rotates counterclockwise from an inner end 113 toward an outer end 114 when viewed from above. As shown in FIG. 2(b), the inner end 113 protrudes from the surface of the light guide layer 110 downward in the figure, and the outer end 114 protrudes from the surface of the light guide layer 110 upward in the figure.

As shown in FIG. 2(c), a protective layer 130 is formed like a holed plate having an opening 130a in the middle thereof (a holed disk in the illustrated example) substantially similarly to said light guide layer 110. The protective layer 130 is provided with a through hole 131 into which the inner end 113 of the light guide path section 111 of the light guide layer 110 is inserted and a through hole 132 into which the outer end 114 is inserted.

As shown in FIG. 3(a), a light guide layer 120 has a light guide path section 121 formed in an eddy pattern (that is, a helical or spiral configuration drawn on a plane) and a protective material 122 formed to fill up regions of the plane where the light guide section 121 is not formed, and the layer is formed like a holed plate having an opening 120a in the middle thereof (a holed disk in the illustrated example). The light guide path section 121 forms a part of said light guide path 100L, and it is configured such that it rotates counterclockwise from an outer end 124 toward an inner end 123 when viewed from above. As shown in FIG. 3(b), the inner end 123 protrudes from the surface of the light guide layer 110 upward in the figure, and the outer end 124 protrudes from the surface of the light guide layer 110 downward in the figure.

In said detection light guide body 100S, the inner end 113 and the inner end 123 are inserted into said through hole 131 of the protective layer 130 from above and below and are joined to each other. The outer end 114 and the outer end 124 are inserted into said light guide through hole 132 of the protective layer 130 from above and below and are joined to each other. As a result, the light guide path sections 111 and 121 formed in the light guide layers 110 and 120 are joined to each other to collectively form said light guide path 100L in the detection light guide body 100S. Specifically, for example, the light guide path section 111 of a light guide layer 110 provided in a lower position is formed so it extends in a counterclockwise direction from the inner end 113, and the outer end 114 inserted in the through hole 132 of the protective layer 130 located above and adjacent to the same is connected to the outer end 124 of the light guide layer 120 above the protective layer 130 through said protective layer 130. The light guide path section 121 of the light guide layer 120 is formed so it extends in a counterclockwise direction from the outer end 124, and the inner end 123 of the same is connected to the inner end 113 of the light guide layer 110 located above the same, through the protective layer 130 located above and adjacent to the same. Thus, the light guide path 100L is wound in an eddy pattern in the light guide layers 110 and 120 which are successively connected to each other upward and downward through the protective layers 130.

A light-transmissive material that constitutes the light guide path sections 111 and 121 in said light guide layers 110 and 120 preferably exhibits a light transmission of 80% or more and a refractive index of 1.4 or more against rays of light used for measurement. Such translucent materials include acrylic polymers, polymethylpentene, plasticized polyvinyl chlorides, vinyl acetate-vinyl chloride copolymers, and ethylene-vinyl acetate copolymers.

The cross sections of the light guide path sections 111 and 121 may have any appropriate configuration such as a circular, square or rectangular configuration, and it is only required that they have a diameter equal to or greater than the wavelength used when converted into a circle (the diameter of a section of a circle having the same sectional area as that of the section of interest). For example, in the case of visible light, the diameter may normally be 1 $\mu$m or more when converted into a circle diameter.

When the radius of curvature of said light guide path sections 111 and 121 in an eddy pattern is small, since some rays enter the interface at an angle in the excess of an angle of total reflection that is determined by the refractive indices of the light guide path sections 111 and 121 and the neighborhood of the same (the protective materials 112 and 122 of the first embodiment) (that is, an incident angle smaller than the angle of total reflection) and exit to the outside, the light guide layers 110 and 120 are preferably provided with regions where the light guide path sections 111 and 121 are not formed in the middle of the same, as described above. Specifically, the regions where the light guide path sections 111 and 121 are formed are preferably formed in an annular configuration as viewed on the plane of the same. In particular, the openings 110a and 120a are formed in the middle as shown in FIG. 2 and FIG. 3. Since there is provided openings where neither light guide path nor protective material exists, a light guide material such as said optical fiber 143, the light source, the photo detector, the board, and the like can be provided in the openings. Since this improves the utilization of the space, the optical gyroscope as a whole can be configured more compactly.

The material to serve as said protective material 112 and 122 and the protective layers 130 preferably has a refractive index smaller than that of the light-transmissive material to form the light guide path sections in order to achieve the effect of entrapping rays of light in said light guide path sections 111 and 121. For example, it may be tetrafluoroethylene-hexafluoropropylene, tetrafluoroethylene-hexafluoropropylene-vinylidene fluoride, polymethylpentene, ethylene-vinyl acetate copolymer, vinyl acetate-vinyl chloride copolymer, or the like.

The thickness of the protective materials 112 and 122 may be a thickness that is sufficient to cover the surface of said light guide path sections 111 and 121 with reliability. When the protective materials have light-transmissive properties, a thickness that allows the formation of an effective optical coupling surface will be sufficient and, for example, a thickness ranging from about 1 to 2000 $\mu$m will be sufficient.

While a resin material is used for the light guide path sections 111 and 121 in the above disclosure, for example, a glass material such as $SiO_2$—$GeO_2$, $SiO_2$—$GeO_2$—$Al_2O_3$, $SiO_2$—$GeO_2$—$Al_2O_3$—$MgO$, or the like may be used. In this case, such a glass material may be used also for said protective materials 112 and 122. At this time, in order to set the refractive index of the light guide path sections higher than the refractive index of the protective materials, they may be formed in different compositions.

Figure 4:
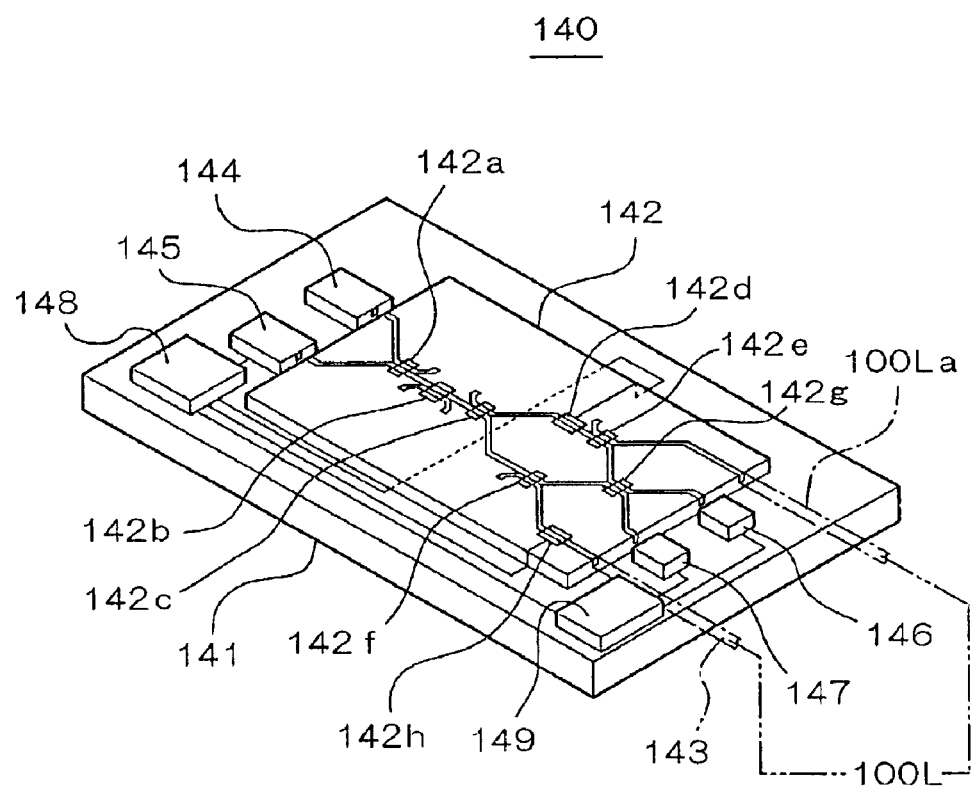
FIG. 4 is a schematic perspective view showing a structure of a light measuring board 140 of the optical gyroscope 100.

FIG. 4 is a schematic perspective view showing a structure of the light measuring board 140 shown in FIG. 1 in detail. In the light measuring board 140, an optical circuit board (optical integrated circuit board) 142 constituted by a piezoelectric body such as $LiNbO_3$ is provided on a base substrate 141 constituted by a silicon substrate, insulated substrate, or the like. An optical circuit board in the present specification may be a material other than a piezoelectric body as long as it is a material having electro-optical characteristics such as an electro-optical crystal. On the base substrate 141, a predetermined wiring pattern is formed, and a light source 144 constituted by a semiconductor laser or the like, photo detectors 145, 146, and 147 constituted by photo diodes or the like, and a control circuit 148 and a processing circuit 149 constituted by circuit chips such as semiconductor integrated circuits are mounted.

On the optical circuit board 142, there is provided photo-couplers 142a, 142c, 142e, 142f, and 142g constituted by beam splitters or the like for splitting light emitted by the light source 144, a polarizer 142b for converting incident light into a polarized light component in a certain direction, and optical modulators 142d and 142h for modulating light. The photo-coupler 142a is configured such that it can separate and integrate light paths between said light source 144 and photo detector 145 and the polarizer 142b, and the photo-coupler 142c is configured such that it can separate and integrate light paths between the polarizer 142b and the optical modulator 142d and the photo-coupler 142f. Light paths respectively extending to said photo detectors 146 and 147 and a light path connected to the end 100La or the other end 100Lb (optical fiber 143) of the light guide path 100L of said detection light guide body 100S are provided ahead of the photo-couplers 142e and 142f. The photo-coupler 142g is configured such that it can separate and integrate light paths between the photo-couplers 142e and 142f and the photo detectors 146 and 147.

In this light measuring board 140, light emitted by the light source 144 passes through the polarizer 142b to become a polarized light which is then separated by the photo-coupler 142c into two light waves. The light waves enter the light guide path 100L of the detection light guide body 100S in opposite directions through the optical modulators 142d and 142h. The two light waves travel in the light guide path 100L in opposite directions and, when the two light waves return, they are integrated by the photo-coupler 142c. An interference wave (beat) is detected by the photo detector 145 through the polarizer 142b. At this time, a beat signal between the two light waves that have propagated in the light guide path 100L is detected, and the frequency of the detected signal has a correlation with the rotating speed of the optical gyroscope 100 because of the Sagnac effect.

The optical modulator 142d modulates light with a serrated modulation waveform having a period of 2T according to a control signal transmitted by the control circuit 148 (serrodyne) and can shift the frequency of one of the light waves by the frequency of the modulation waveform. Thus, a predetermined frequency difference is introduced between the two light waves traveling in the coiled light guide path 100L in directions opposite to each other. Feedback is provided to the frequency of modulation (serrodyne frequency) performed by said optical detector 142d such that the frequency difference will cancel a phase difference attributable to said Sagnac effect or such that the value detected by the photo detector 145 will be reduced. Consequently, the control input from the control circuit 148 represents the detection value.

The optical modulator 142h performs a sine wave modulation on the light waves, and the detection value of the photo detector 145 is extracted at the period of this modulation, which reduces the influence of fluctuations of the intensity of light. In the present mode for carrying out the invention, a configuration is employed in which the control input of the control circuit 148 is processed at the processing circuit 149 with reference to values detected by the photo detectors 146 and 147 to output a rotating speed and an angular position from the processing circuit 149.

While an optical gyroscope having a closed loop type control system is configured as described above in the present mode for carrying out the invention, a configuration to accommodate an open loop type control system may be employed.

In the first embodiment, the light guide path 100L formed by stacking the plurality of light guide layers 110 and 120 is configured in the detection light guide body 100S as described above. Therefore, the overall configuration can be made more compact than that in the case of an optical fiber that has a clad layer thicker than a core. In particular, since the light guide path sections 111 and 121 of the respective light guide layers 110 and 120 are formed in an eddy pattern (a planer helical or spiral configuration), the integration density of the light guide path 100L can be much better than that is achievable in the prior art, which makes it possible to achieve a significant reduction in the size of the optical gyroscope.

Since the light guide layers 110 and 120 are stacked with the protective layers 130 interposed therebetween, manufacture is facilitated despite of the size reduction. For example, in the first embodiment, it is possible to fabricate the light guide layers 110 and 120 separately from the protective layers 130 and to stack them as shown in FIG. 1, thereby allowing easy assembly. In this case, connection between the layers and connection between the inner ends and outer ends of the light guide paths in the light guide layers 110 and 120 may be carried out using various methods including bonding with an adhesive or the like, welding through a heating process or the like, and jointing by precisely abutting clean surfaces.

Further, when the light guide layers and the protective layers are manufactured especially from synthetic resin, they can be relatively easily manufactured using methods such as injection molding and, in addition, they can be manufactured using fine processing according to known methods such as photolithographic techniques.

Since in said light guide layers 110 and 120 the protective materials 112 and 122 are filled such that gaps between the light guide path sections 111 and 121 are completely filled up, the influence of thermal expansion on the optical path length of the light guide path sections can be reduced; the influence of a temperature change on the light guide path such as a dimensional change can be reduced; and temperature characteristics can be significantly improved from those in the case of an optical fiber.

In the above-described embodiment, the through holes 131 and 132 are formed in the protective layers 130 as connecting regions for connecting the light guide path sections, and a configuration is employed in which the ends of the light guide path sections of said light guide layers 110 and 120 as optical connecting sections are inserted in those through holes 131 and 132. Specifically, the inner ends 113 and 123 and the outer ends 114 and 124 of the light guide path sections 111 and 121 to serve as optical connecting sections are provided between adjoining light guide layers 110 and 120 in the detection light guide body 100S. However, a configuration may be employed in which light guide connecting sections are formed from the same material as the light guide path sections 111 and 121 in the space of the protective layers 130 in which said through holes 131 and 132 are provided or on outer circumferential surfaces of the protective layers 130 and in which the ends of the light guide path sections of adjoining light guide layers 110 and 120 are bonded to surfaces exposed on the light guide connecting sections.

[Second Embodiment of the Invention]

Figure 6:
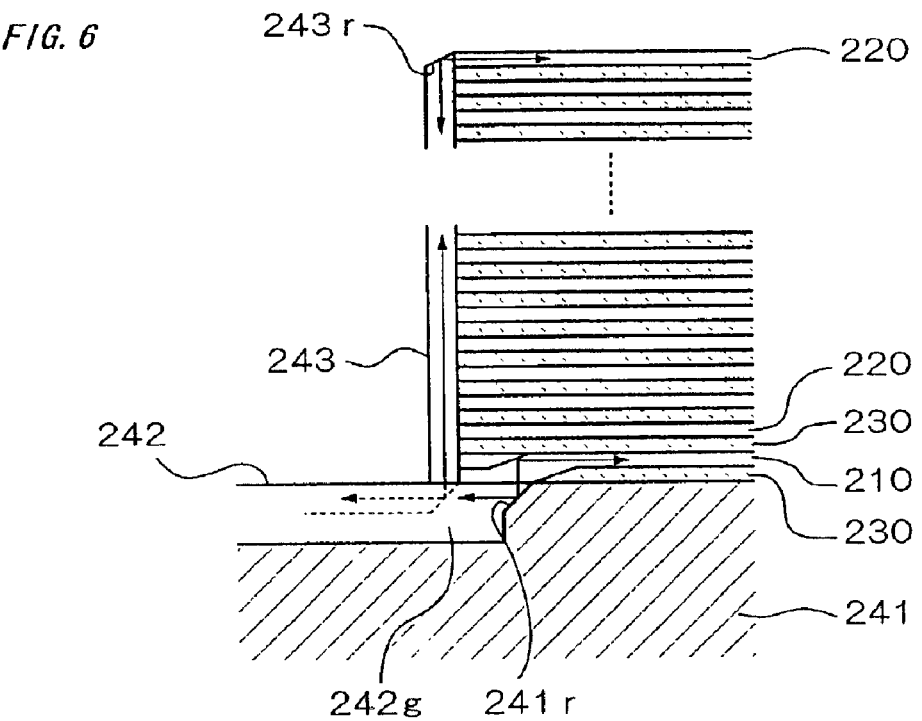
FIG. 6 is an enlarged partial sectional view showing a part of the optical gyroscope 200 in an enlarged form.

An optical gyroscope 200 in a second embodiment will now be described with reference to FIG. 5 and FIG. 6. The optical gyroscope 200 has a detection light guide body 200S in which light guide layers 210 and 220 having the same configuration as that in the first embodiment are alternately stacked on a light measuring board 240 with protective layers 230 interposed therebetween. Since the detection light guide body 200S constituted by the light guide layers 210 and 220 and the protective layers 230 has substantially the same material and structure as those in the first embodiment, like parts will not be described here.

In the second embodiment, in the light measuring board 240, an optical circuit board 242 constituted by a piezoelectric body such as $LiNbO_3$ is embedded substantially in the middle of a base substrate 241 constituted by an insulated substrate or the like; the optical circuit board 242 is optically connected to an inner end of a light guide path section provided in a bottom light guide layer 210 through a connecting section 242g and is optically connected to an inner end of a light guide path section formed in a top light guide layer 220 through an optical fiber 243 secured on an inner surface of a through hole 200Sa in the detection light guide body 200S. As shown in FIG. 6, a reflecting surface 241r is provided on the base substrate 241 between the bottom light guide layer 210 and the connecting section 242g, and a reflecting surface 243r that is constituted by an inner surface of the optical fiber 243 is provided between the top light guide layer 220 and the optical fiber 243. Those reflecting surfaces 241r and 243r connect a light path between the interior of the detection light guide body 200S and the optical circuit board 242 or the optical fiber 243.

A light source 244 and a photo detector 245 are mounted on the base substrate 241, and a control circuit 248 constituted by a semiconductor integrated circuit or the like is also mounted. Photo-couplers 242a and 242b and a phase modulator 242c are also provided in the optical circuit board 242.

The light measuring board 240 splits light emitted by the light source 244 into two light paths with the photo-coupler 242b and introduces the two light waves into the light guide path in the detection light guide body 200S in directions opposite to each other after modulating the phase of one of the light waves. The two light waves that have traveled in the light guide path and exited from the ends thereof opposite to each other are integrated by the photo-coupler 242b, and an interference wave between them is detected by the photo detector 245 through the photo-coupler 242a. Thus, the light measuring board 240 adopts a detection principle that is an opening loop type basic interference method.

In this embodiment, since the optical circuit board 242, the light source 244, the photo detector 245, and the control circuit 248 are provided in a region the plane of which substantially entirely overlaps with the through hole 200Sa in the detection light guide body 200S, the optical gyroscope 200 as a whole can be configured compactly.

[First Method of Manufacturing Detection Light Guide Body Using Optical Shaping Process]

A method of manufacturing a detection light guide body using an optical shaping process will now be described. In an optical shaping process, a liquid is partially solidified to form a shape in accordance with the solidified part, and a typical material used is a photo-setting resin, for example. A photo-setting resin is obtained by adding a photo-polymerization initiator to a base resin material, and a shaping improver, stabilizer, filler, pigment and the like are added as occasions demand.

Base materials include urethane acrylate, epoxy acrylate, polyester acrylate, unsaturated polyester, epoxy, and vinyl ether. Shaping improvers include multi-functional acrylate monomer and mono-functional acrylate. Polymerization initiators include benzoin isopropyl ether, benzophenone, Michler's ketone, chlorothioxanthone, isopropylthioxantone, benzyl dimethyl ketal, acetophenone diethyl ketal, α-hydroxy cyclohexyl phenyl ketone, 2-hydroxy-2-metyl phenyl propane.

Ultraviolet light having high energy is frequently used as light for causing the setting action of said photo-setting resin, and a laser having high irradiation energy is frequently used as a light source. In general, an oscillation wavelength of an ultraviolet laser ranges from 260 to 450 nm.

Figure 7:
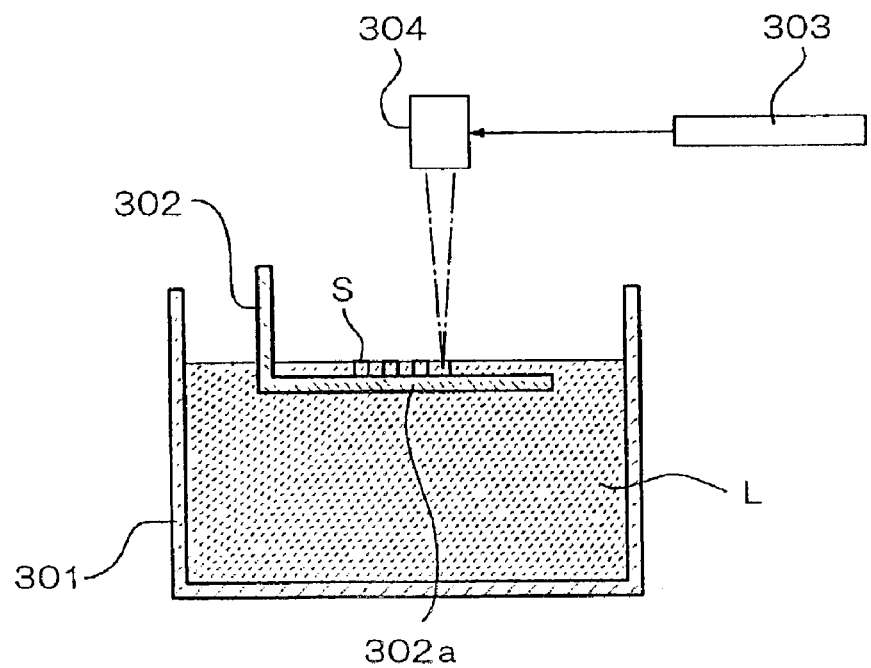
FIG. 7 is a schematic illustration showing manufacture of light guide path sections using an optical shaping process.

FIG. 7 shows how to form said light guide path sections using an optical shaping process. An unset resin L is placed in a container 301. A support member 302 is provided in the unset resin L and positioned such that a support surface 302a of the support member is covered by a thin layer of the unset resin L. Said support surface 302a is irradiated with light emitted by a light source 303 constituted by a laser oscillator or the like through an optical system 304. The part irradiated with light is solidified to become a set resin S as illustrated. The irradiated spot on the support surface 302a is moved in a circular manner, e.g., in the form of an eddy, on the support surface 302a, which makes it possible to form a light guide path section as shown in FIG. 2, FIG. 3, and FIG. 5 on the support surface 302a. Another amount of the resin is solidified around the light guide path section thus formed to form each of light guide layer which can then be assembled with protective layers interposed as in the above-described embodiments.

Figure 8:
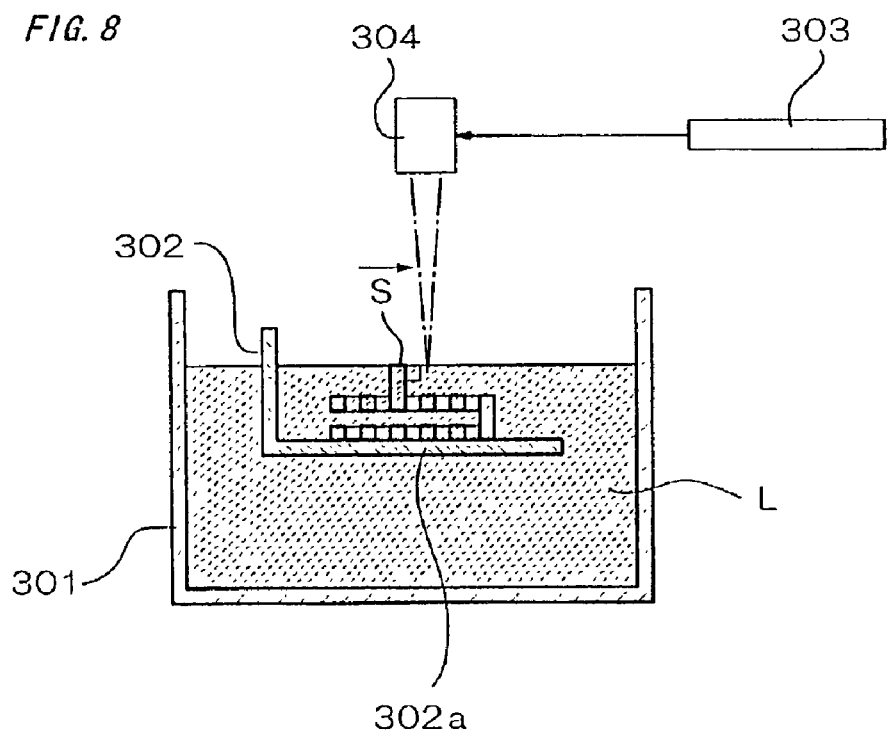
FIG. 8 is a schematic illustration showing manufacture of a light guide path using an optical shaping process.
Figure 9:
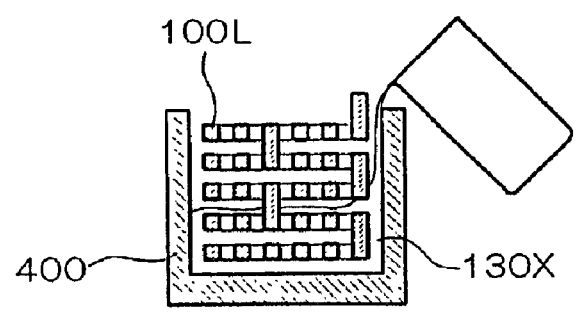
FIG. 9 is a schematic illustration showing the step of filling a protective material around a light guide path manufactured using the method shown in FIG. 8.

The use of the above-described optical shaping process makes it possible to form an integral light guide path by connecting the light guide path sections of the layers to each other instead of forming a plurality of light guide layers and then stacking them as described above. FIG. 8 and FIG. 9 show such states of manufacture. As shown in FIG. 8, an integral light guide path having a plurality of layer structures is formed using a method in which a light guide path section of a first layer is first formed using an optical shaping process as described above; the support member 302 is then lowered in the unset resin L to form a light guide path section of a second layer such that it is contiguous with the light guide path section of the first layer; and the support member 302 is further lowered to form a light guide path section of a third layer. Obviously, the light guide path thus formed may constitute the light guide path 100L as a whole formed in the detection light guide body 100S of the optical gyroscope 100 in said first embodiment, and it may alternatively constitute a part (e.g., one half or one-third) of the light guide path 100L.

The light guide path 100L shaped as described above is placed in a molding die 400 as shown in FIG. 9, and a resin 130X to form said protective layers and protective materials is put and set in the same, which makes it possible to mold said detection light guide body 100S.

[Third Embodiment of the Invention]

A third embodiment of the invention will now be described with reference to FIGS. 10 to 13. In the third embodiment, a detection light guide body is configured by alternately stacking light guide layers 410 as shown in FIG. 10 and light guide layers 420 as shown in FIG. 11.

A light guide layer 410 is constituted by a plate-like light guide body and provided with a light guide path section 411 that is formed in a circular configuration. The periphery of the light guide path section 411 is protected with a protective material 412. The light guide path section 411 and the protective material 412 may be configured using the materials as described in the above embodiments of the invention. The light guide path section 411 is configured in the form of a helix or spiral that is wound in inward and outward directions in the plane of the same in the illustrated example. The light guide layer 410 has an annular configuration as a whole, and an opening 410a is provided in the middle of the same.

Figure 10:
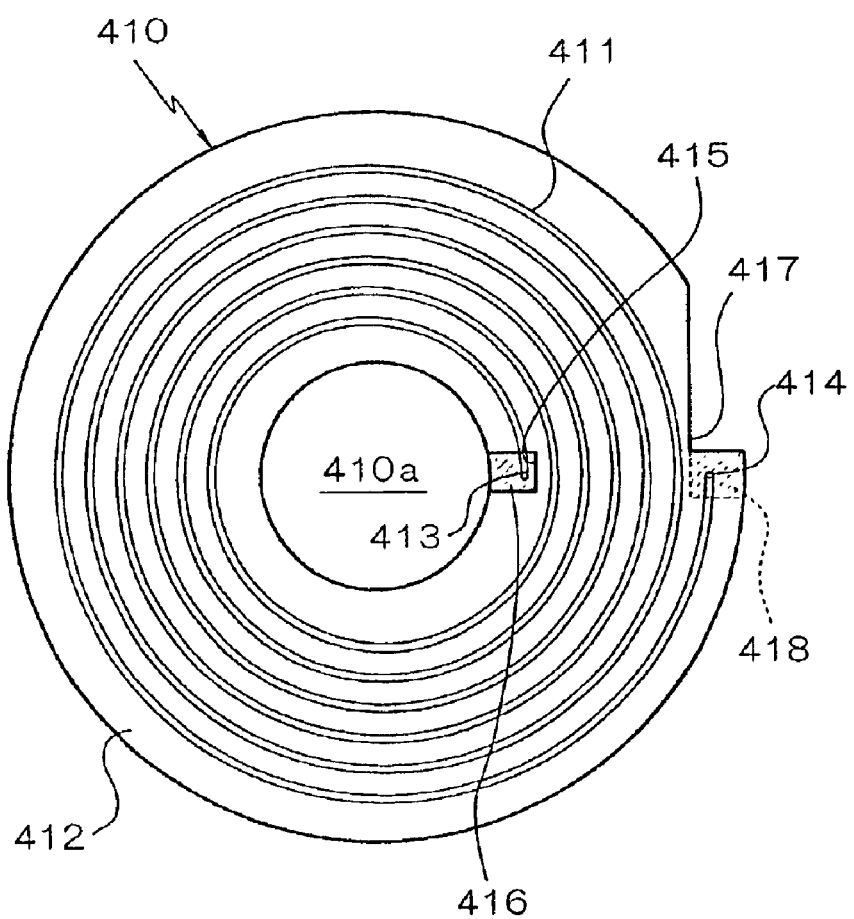
FIG. 10 is a plan view showing a structure of one light guide layer in a third mode for carrying out the invention.
Figure 11:
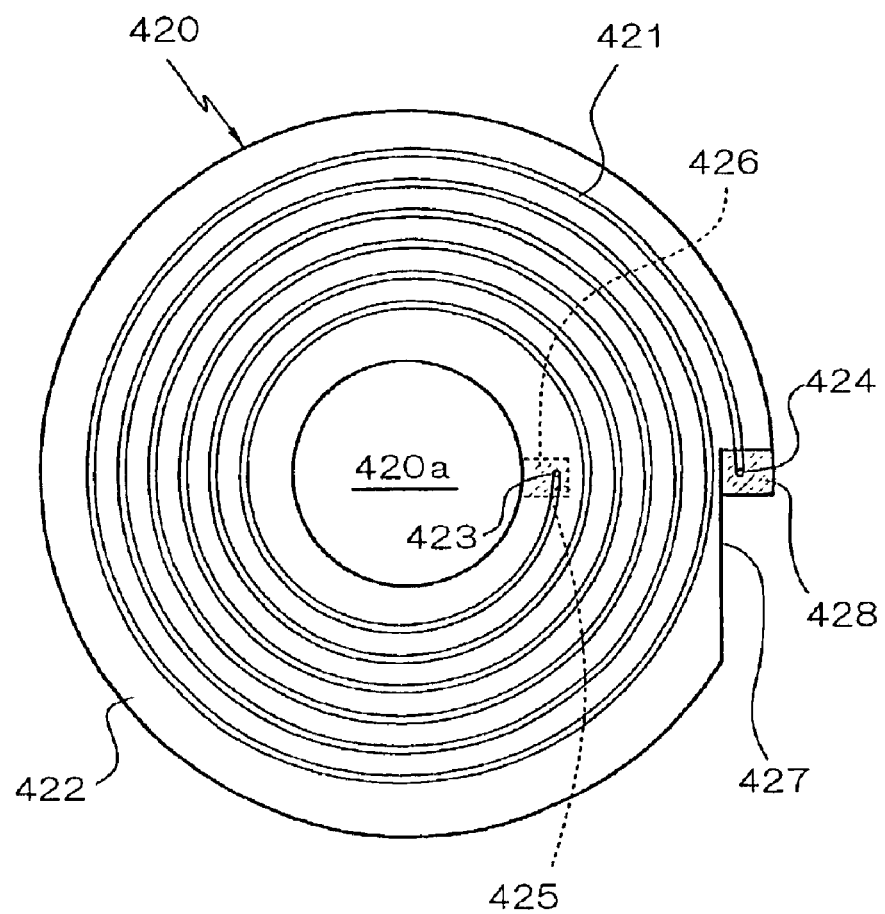
FIG. 11 is a plan view showing a structure of another light guide layer in the third mode for carrying out the invention.

An inner end 413 of the light guide path section 411 is bent substantially perpendicularly to the light guide path section 411 that is formed in a circular configuration to protrude toward the other side of the plane of FIG. 10. At the bent portion of the inner end 413 of the light guide path section 411, a cutout 415 having an inclined surface is formed on the top surface (the surface facing the side of the plane shown in FIG. 10) of the light guide layer 410. A reflecting layer 416 is formed on the inclined surface of the cutout 415, and a bottom surface of the reflecting layer 416 is configured to serve as a reflecting surface in a face-to-face relationship with said bent portion. The reflecting surface is inclined at about 45 deg to the surface of the light guide layer.

An outer end 414 of the light guide path section 411 is bent substantially perpendicularly to the light guide path section 411 that is formed in a circular configuration to protrude toward this side of the plane of FIG. 10. At the bent portion of the outer end 414 of the light guide path section 411, a cutout 417 having an inclined surface is formed on the bottom surface (the surface facing the opposite side of the plane shown in FIG. 10) of the light guide layer 410. An inclined surface that is inclined in the circulating direction (the direction in which the circle extends around the center)

is provided at the cutout 417. A reflecting layer 418 is formed on the inclined surface, and a top surface of the reflecting layer 418 is configured to serve as a reflecting surface in a face-to-face 4relationship with said bent portion. The reflecting surface is inclined at about 45 deg to the surface of the light guide layer.

When the light guide layer 410 is formed using die molding, said cutouts 415 and 417 may be integrally formed through selection of the shape of the die. Alternatively, they may be formed by cutting an inner circumferential portion and an outer circumferential portion of the light guide layer 410 after forming the general structure of the light guide layer 410. The reflecting layers 416 and 418 may be formed from a metal such as aluminum, chromium or silver or an alloy that is primarily composed of such a metal. Methods for forming the reflecting layers 416 and 418 include vacuum deposition, sputtering, and CVD.

A light guide layer 420 is constituted by a plate-like light guide body and provided with a light guide path section 421 that is formed in a circular configuration. The periphery of the light guide path section 421 is protected with a protective material 422. The light guide path section 421 and the protective material 422 may be configured using the materials as described in the above embodiments of the invention. The light guide path section 421 is configured in the form of a helix or spiral that is wound in inward and outward directions in the plane of the same in the illustrated example. The light guide layer 420 has an annular configuration as a whole, and an opening 420a is provided in the middle of the same.

An inner end 423 of the light guide path section 421 is bent substantially perpendicularly to the light guide path section 421 that is formed in a circular configuration to protrude upward (toward the surface facing the side of the plane shown in FIG. 11). At the bent portion of the inner end 423 of the light guide path section 421, a cutout 425 having an inclined surface is formed on the bottom surface (the surface facing the opposite side of the plane shown in FIG. 11) of the light guide layer 420. An inclined surface inclined in the circulating direction (the direction in which the circle extends around the center) is provided at the cutout 425. A reflecting layer 426 is formed on the inclined surface, and a top surface of the reflecting layer 426 is configured to serve as a reflecting surface in a face-to-face relationship with said bent portion. The reflecting surface is inclined at about 45 degree to the surface of the light guide layer.

An outer end 424 of the light guide path section 421 is bent substantially perpendicularly to the light guide path section 421 that is formed in a circular configuration to protrude downward (toward the opposite side of the plane shown in FIG. 11). At the bent portion of the outer end 424 of the light guide path section 421, a cutout 427 having an inclined surface is formed on the top surface (the surface facing the side of the plane shown in FIG. 11) of the light guide layer 420. A reflecting surface 428 is formed on the inclined surface of the cutout 427, and a bottom surface of the reflecting layer 428 is configured to serve as a reflecting surface in a face-to-face relationship with said bent portion. The reflecting surface is inclined at about 45 degree to the surface of the light guide layer.

When the light guide layer 420 is formed using die molding, said cutouts 425 and 427 may be integrally formed through selection of the shape of the die. Alternatively, they may be formed by cutting an inner circumferential portion and an outer circumferential portion of the light guide layer 420 after forming the general structure of the light guide layer 420. The reflecting layers 426 and 428 may be formed from a metal such as aluminum, chromium or silver or an alloy that is primarily composed of such a metal. Methods for forming the reflecting layers 426 and 428 include vacuum deposition, sputtering, and CVD.

Figure 12:
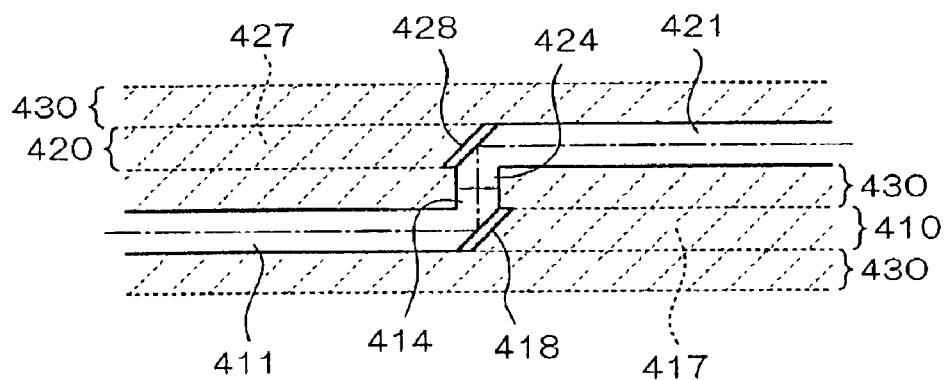
FIG. 12 is an enlarged sectional view showing a structure in the vicinity of an optical connecting section at an outer circumference in the third mode for carrying out the invention.
Figure 13:
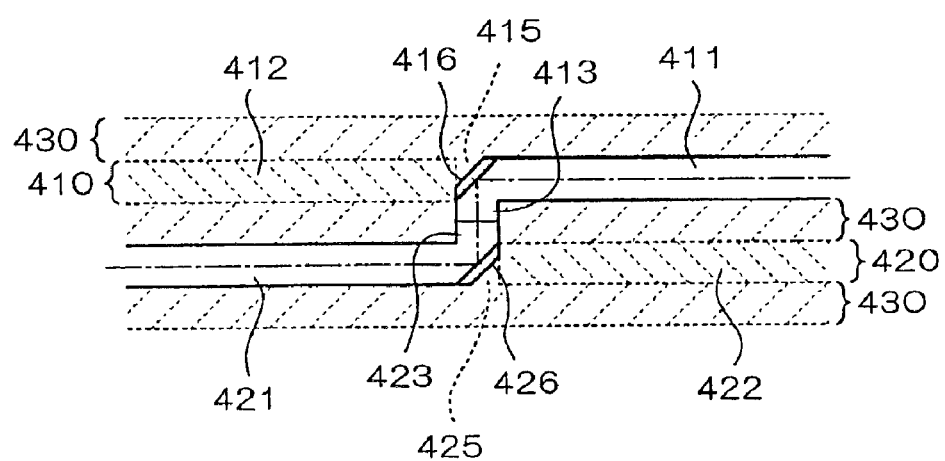
FIG. 13 is an enlarged sectional view showing a structure in the vicinity of an optical connecting section at an inner circumference in the third mode for carrying out the invention.

Said light guide layers 410 and 420 are alternately stacked with interposed protective layers 430 as shown in FIG. 12 and FIG. 13. The protective layers 430 are formed from the same material as that in the above embodiments of the invention. Some parts of the protective layers 430 are preferably configured such that they fill up the interior of said cutouts 415, 417, 425, and 427 as shown in FIG. 12 and FIG. 13. For example, such a configuration can be formed by using a method in which the protective layers 430 are melted by heating or the like after interposing the protective layers 430 between the light guide layers 410 and the light guide layers 420 and in which some parts of the protective layers 430 flow to fill the interior of said cutouts. When an unset protective material is filled in gaps between the light guide layers 410 and 420 and is set to form the protective layers 430, the protective layers may be formed using a method in which said cutouts are filled with a part of the unset protective material. Further, the protective layers 430 may be formed in a configuration that fits said cutouts in advance.

FIG. 12 is an enlarged sectional view showing the neighborhood of an optical connecting section where the outer end 414 of the light guide path section 411 of a light guide layer 410 as described above and the outer end 424 of the light guide path section 421 of a light guide layer 420 are optically connected. Light that has propagated in the light guide path section 411 of the light guide layer 410 is reflected substantially perpendicularly by the reflecting surface of the reflecting layer 418 provided at the bent portion; it passes through the outer end 414 of the light guide layer 410; it then passes through the outer end 424 of the light guide layer 420 connected to the outer end 414 to be reflected substantially perpendicularly by the reflecting layer 428; and it is then introduced into the light guide path section 421 of the light guide layer 420. Conversely, light that has propagated in the light guide path section 421 of the light guide layer 420 travels a path that is the reverse of the path described above to be introduced into the light guide path section 411 of the light guide layer 410.

FIG. 13 is an enlarged sectional view showing the neighborhood of an optical connecting section where the inner end 413 of the light guide path section 411 of said light guide layer 410 and the inner end 423 of the light guide layer 420 are optically connected. Light that has propagated in the light guide path section 411 of the light guide layer 410 is reflected substantially perpendicularly by the reflecting surface of the reflecting layer 416 provided at the bent portion; it passes through the inner end 413 of the light guide layer 410; it then passes through the inner end 423 of the light guide layer 420 connected to the inner end 413 to be reflected substantially perpendicularly by the reflecting layer 426; and it is then introduced into the light guide path section 421 of the light guide layer 420. Conversely, light that has propagated in the light guide path section 421 of the light guide layer 420 travels a path that is the reverse of the path described above to be introduced into the light guide path section 411 of the light guide layer 410.

In the present mode for carrying out the invention, the optical connecting sections are provided between the light guide layers 410 and 420 similarly to said first embodiment of the invention. Since light can be easily deflected by providing the reflecting layers 416, 418, 426, and 428, there is advantages in that the optical connecting sections can be configured compactly and in that optical loss is unlikely to occur at the optical connecting sections even if a great deflection angle is provided.

[Fourth Embodiment of the Invention]

A fourth embodiment of the invention will now be described with reference to FIGS. 14 to 17. In the present mode for carrying out the invention, a detection light guide body is configured by alternately stacking light guide layers 510 as shown in FIG. 14 and light guide layers 520 as shown in FIG. 15.

Figure 14:
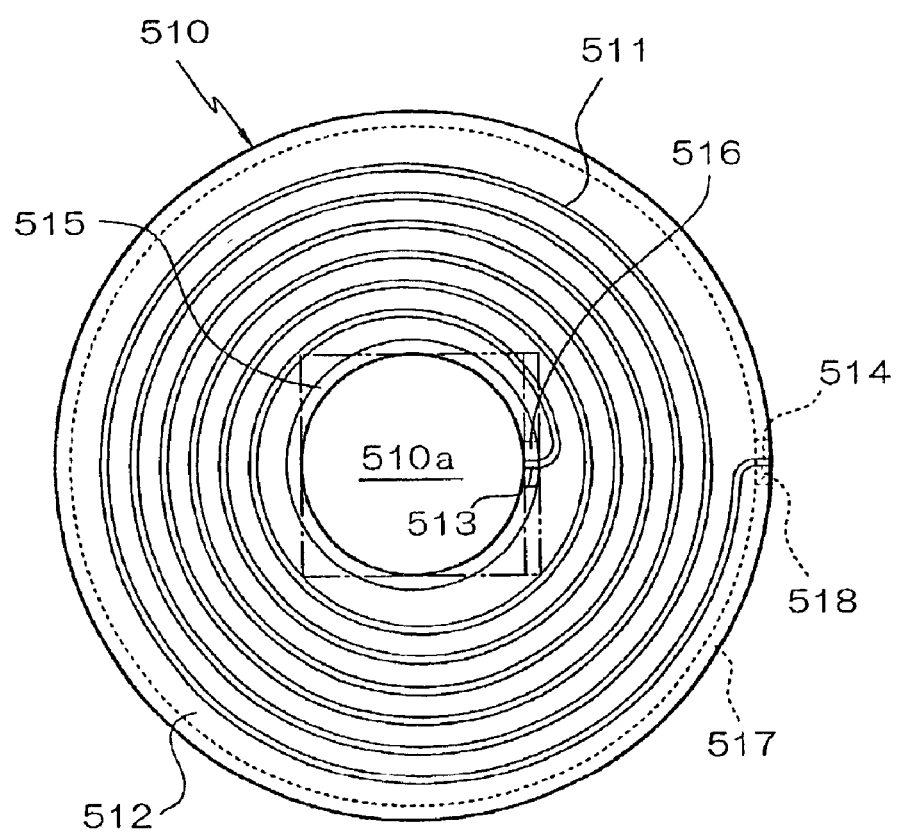
FIG. 14 is a plan view showing a structure of one light guide layer in a fourth mode for carrying out the invention.
Figure 15:
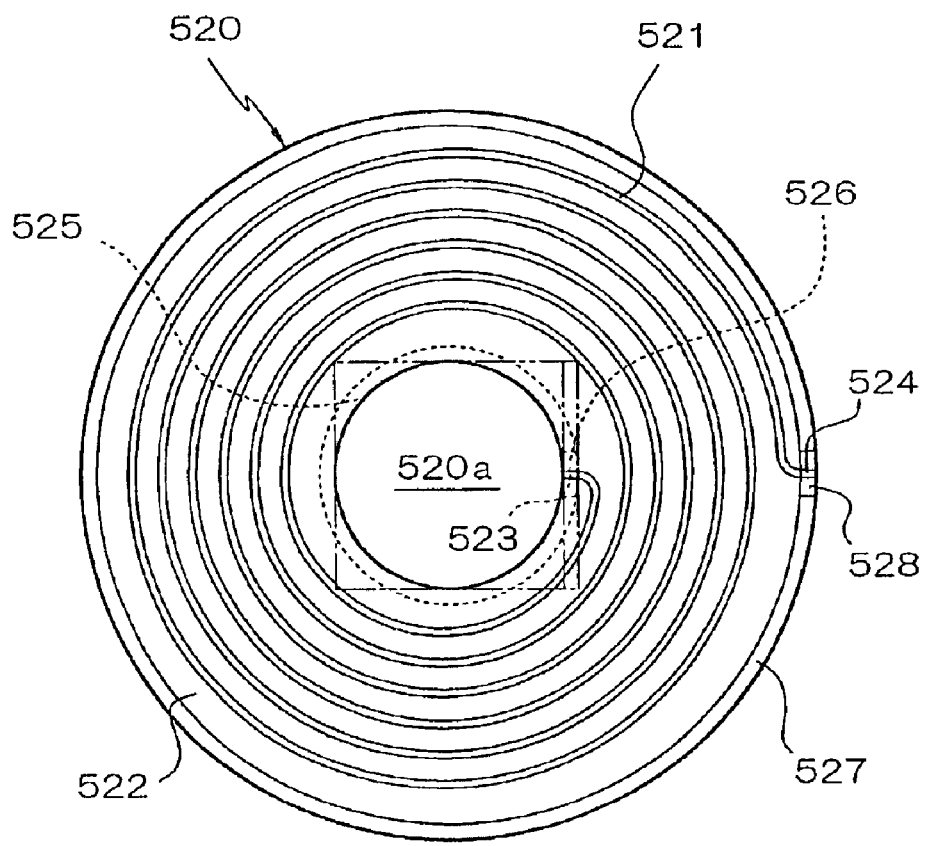
FIG. 15 is a plan view showing a structure of another light guide layer in the fourth mode for carrying out the invention.

A light guide layer 510 is constituted by a plate-like light guide body and provided with a light guide path section 511 that is formed in a circular configuration, as shown in FIG. 14. The periphery of the light guide path section 511 is protected with a protective material 512. The light guide path section 511 and the protective material 512 may be configured using the materials as described in the above embodiments of the invention. The light guide path section 511 is configured in the form of a helix or spiral that is wound in inward and outward directions in the plane of the same in the illustrated example. The light guide layer 510 has an annular configuration as a whole, and an opening 510a is provided in the middle of the same.

In a light guide layer 510 in the fourth embodiment of the invention, an inner end section 513 extending toward the center of the light guide layer 510 and an outer end section 514 extending outwardly in the radial direction thereof are provided at both ends of the light guide path section 511 having a circular configuration.

At an inner circumferential edge of the light guide layer 510 facing the opening 510a, there is formed an inclined surface section 515 which is inclined inwardly in the radial direction to face upward (toward the side of the plane shown in FIG. 14), and an end face of said inner end 513 is exposed at the inclined surface section 515. A reflecting layer 516 that covers the exposed end face of said inner end 513 is formed on the inclined surface section 515. A reflecting surface of the reflecting layer is inclined at about 45 deg to the surface of the light guide layer.

At an outer circumferential edge of the light guide layer 510, there is formed an inclined surface section 517 which is inclined outwardly in the radial direction to face downward (toward the opposite side of the plane shown in FIG. 14), and an end face of said outer end 514 is exposed at the inclined surface section 517. A reflecting layer 518 that covers the exposed end face of said outer end 514 is formed on the inclined surface section 517. A reflecting surface of the reflecting layer is inclined at about 45 degree to the surface of the light guide layer.

A light guide layer 520 is constituted by a plate-like light guide body and provided with a light guide path section 521 that is formed in a circular configuration, as shown in FIG. 15. The periphery of the light guide path section 521 is protected with a protective material 522. The light guide path section 521 and the protective material 522 may be configured using the materials as described in the above embodiments of the invention. The light guide path section 521 is configured in the form of a helix or spiral that is wound in inward and outward directions in the plane of the same in the illustrated example. The light guide layer 520 has an annular configuration as a whole, and an opening 520a is provided in the middle of the same.

In a light guide layer 520 in the fourth embodiment of the invention, an inner end section 523 extending toward the center of the light guide layer 520 and an outer end section 524 extending outwardly in the radial direction thereof are provided at both ends of the light guide path section 521 having a circular configuration.

At an inner circumferential edge of the light guide layer 520 facing the opening 520a, there is formed an inclined surface section 525 which is inclined inwardly in the radial direction to face downward (toward the opposite side of the plane shown in FIG. 15), and an end face of said inner end 523 is exposed at the inclined surface section 525. A reflecting layer 526 that covers the exposed end face of said inner end 523 is formed on the inclined surface section 525. A reflecting surface of the reflecting layer is inclined at about 45 degree to the surface of the light guide layer.

At an outer circumferential edge of the light guide layer 520, there is formed an inclined surface section 527 which is inclined outwardly in the radial direction to face upward (toward the side of the plane shown in FIG. 15), and an end face of said outer end 524 is exposed at the inclined surface section 527. A reflecting layer 528 that covers the exposed end face of said outer end 524 is formed on the inclined surface section 527. A reflecting surface of the reflecting layer is inclined at about 45 deg to the surface of the light guide layer.

Figure 16:
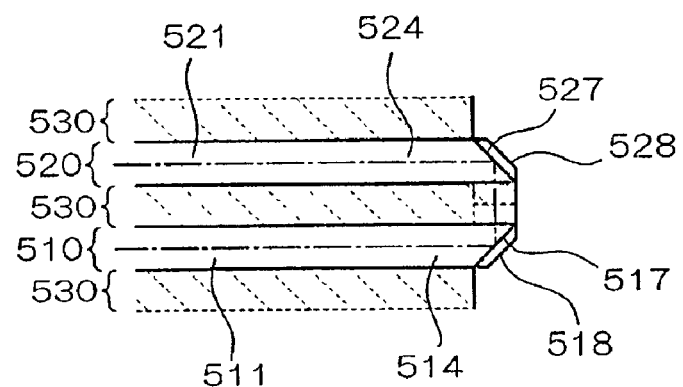
FIG. 16 is an enlarged sectional view showing a structure in the vicinity of an optical connecting section at an outer circumference in the fourth mode for carrying out the invention.

FIG. 16 is an enlarged sectional view showing the neighborhood of an optical connecting section where the outer end 514 of the light guide path section 511 of a light guide layer 510 as described above and the outer end 524 of the light guide path section 521 of a light guide layer 520 are optically connected. Light that has propagated in the light guide path section 511 of the light guide layer 510 passes through the outer end 514 of the light guide layer 510 to be reflected substantially perpendicularly by the reflecting surface of the reflecting layer 518 provided at the end face thereof; it passes through the protective layer 530 to be reflected substantially perpendicularly by the reflecting layer 528; and it is then introduced into the light guide path section 521 of the light guide layer 520 from the outer end 524 of the light guide layer 520. Conversely, light that has propagated in the light guide path section 521 of the light guide layer 520 travels a path that is the reverse of the path described above to be introduced into the light guide path section 511 of the light guide layer 510.

While the light passes through the protective layer 530 between the reflecting layers 518 and 528, since the light enters the protective layer 530 substantially perpendicularly, it can pass through as it is as long as the protective layer 530 is transparent regardless of the refractive index of the same. When the light guide path sections of adjoining light guide layers are thus optically connected through the protective material of a protective layer, a configuration may be employed in which the protective material of the protective layer that is transparent to the light is used and in which the light enters the protective material at an incident angle smaller than the angle of total reflection. When high efficiency of light propagation is to be achieved, as indicated by the dotted line in FIG. 16, a configuration is preferably employed in which, similarly to the above-described embodiments of the invention, the outer end 514 of the light guide path section 511 of the light guide layer 510 is bent upward (toward the side of the plane shown in FIG. 14) and the outer end 524 of the light guide path section 521 of the light guide layer 520 is bent downward (toward the opposite side of the plane shown in FIG. 15) to allow the outer ends 514 and 524 to be directly connected.

Figure 17:
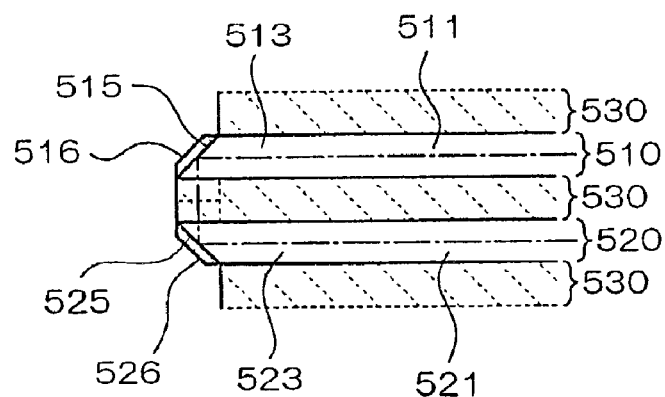
FIG. 17 is an enlarged sectional view showing a structure in the vicinity of an optical connecting section at an inner circumference in the fourth mode for carrying out the invention.

FIG. 17 is an enlarged sectional view showing the neighborhood of an optical connecting section where the inner end 513 of the light guide path section 511 of a light guide layer 510 as described above and the inner end 523 of the light guide layer 520 are optically connected. Light that has propagated in the light guide path section 511 of the light guide layer 510 passes through the inner end 513 of the light guide layer 510 to be reflected substantially perpendicularly by the reflecting surface of the reflecting layer 516 provided at the end face thereof; it passes through the protective layer 530 to be reflected substantially perpendicularly by the reflecting layer 526; and it is then introduced into the light guide path section 521 of the light guide layer 520 from the inner end 523 of the light guide layer 520. On the contrary, light that has propagated in the light guide path section 521 of the light guide layer 520 travels a path that is the reverse of the path described above to be introduced into the light guide path section 511 of the light guide layer 510.

While the light passes through the protective layer 530 between the reflecting layers 516 and 526, since the light enters the protective layer 530 substantially perpendicularly, it can pass through as it is as long as the protective layer 530 is transparent regardless of the refractive index of the same. When high efficiency of light propagation is to be achieved, as indicated by the dotted line in FIG. 17, a configuration is preferably employed in which, similarly to the above-described embodiments of the invention, the inner end 513 of the light guide path section 511 of the light guide layer 510 is bent downward (toward the opposite side of the plane shown in FIG. 14) and the inner end 523 of the light guide path section 521 of the light guide layer 520 is bent upward (toward the side of the plane shown FIG. 15) to allow the inner ends 513 and 523 to be directly connected.

The fourth embodiment of the invention is advantageous during manufacture not only in that the optical connecting sections can be compactly configured while suppressing optical loss at the optical connecting sections as in the third embodiment of the invention but also in that the reflecting surfaces of the optical connecting sections can be more easily formed than in the third embodiment of the invention. Specifically, since the reflecting surfaces of an optical connecting section in the fourth embodiment of the invention are inclined in the radial direction of the light guide layers 510 and 520, they may be easily formed at the inner circumferential edge and the outer circumferential edge of the light guide layers 510 and 520 without provided any complicated structure like the cutouts in the third embodiment of the invention.

In the fourth embodiment of the invention, the reflecting layers 516, 518, 526, and 528 may be formed on the inclined surface sections 515, 517, 525, and 527 provided at said inner circumferential edge and outer circumferential edge after stacking the light guide layers 510 and 520. In this case, reflecting layers that are integrally configured may be formed on an inner circumferential surface and an outer circumferential surface of a stack that has been formed in advance in the stacking direction thereof. This further facilitates the operation of forming reflecting layers.

The openings of said light guide layers 510 and 520 may be formed in a configuration (a square configuration in the illustrated example) other than a circular configuration as indicated by the two-dot chain line in FIG. 14 and FIG. 15, and the light guide layers may be stacked with positioning members fitted, the positioning members having a configuration that matches the configuration of the openings. This makes it possible to achieve precise positioning between the light guide layers. This also makes it possible to easily achieve matching between the positions of the inner end 513 and the outer end 514 of the light guide path section 511 of said light guide layer 510 and the positions of the inner end 523 and the outer end 524 of the light guide path section 521 of the light guide layer 520. The positioning between the light guide layers can be precisely performed by forming the outer circumferential edges of the light guide layers in a configuration (e.g., a square configuration) other than a circular configuration and by stacking the layers while inserting them into a positioning member that matches the configuration of the outer circumferential edges instead of providing said opening. Referring to a method for said positioning, as is well-known, alignment marks may be formed on the light guide layers, and positioning may be performed by matching the alignment marks between the light guide layers. Said various positioning methods in the fourth embodiment of the invention may be similarly used in other embodiments of the invention.

[Fifth Embodiment of the Invention]

A fifth embodiment of the invention will now be described with reference to FIGS. 18 to 23. In the fifth embodiment of the invention, a detection light guide body is configured by alternately stacking light guide layers 610 as shown in FIG. 18 and light guide layers 620 as shown in FIG. 19.

Figure 18:
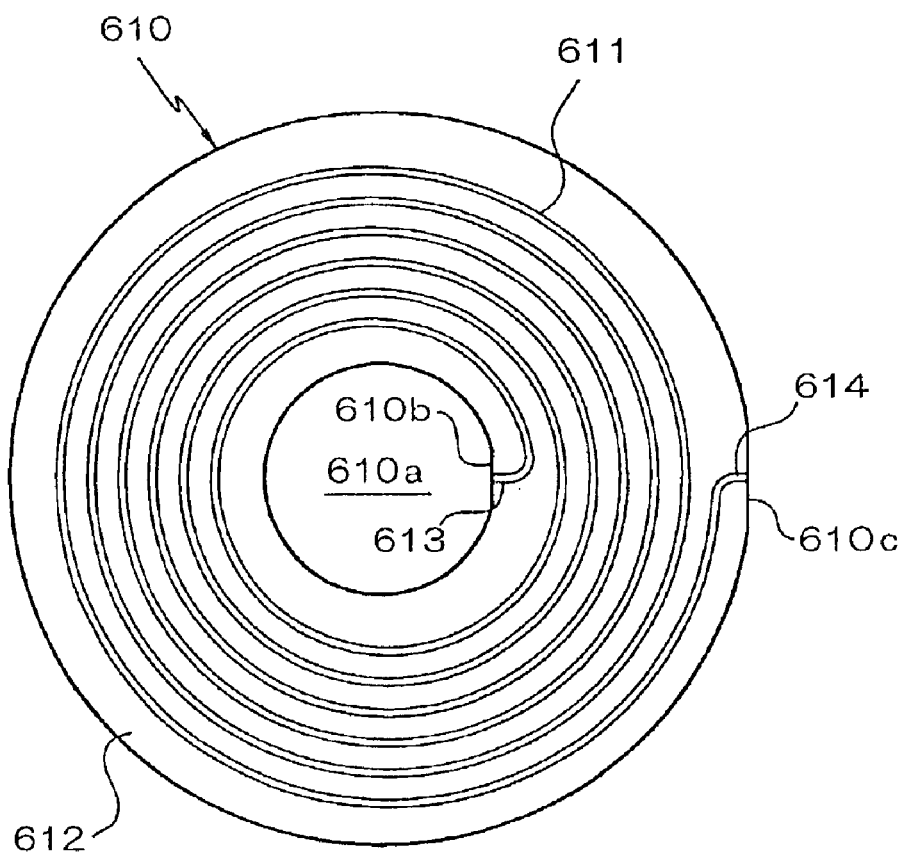
FIG. 18 is a plan view showing a structure of one light guide layer in a fifth mode for carrying out the invention.

A light guide layer 610 is constituted by a plate-like light guide body and provided with a light guide path section 611 that is formed in a circular configuration, as shown in FIG. 18. The periphery of the light guide path section 611 is protected with a protective material 612. The light guide path section 611 and the protective material 612 may be configured using the materials as described in the above embodiments of the invention. The light guide path section 611 is configured in the form of a helix or spiral that is wound in inward and outward directions in the plane of the same in the illustrated example. The light guide layer 610 has an annular configuration as a whole, and an opening 610a is provided in the middle of the same.

In a light guide layer 610 of the fifth embodiment of the invention, an inner end section 613 extending toward the center of the light guide layer 610 having an end face exposed at an inner circumferential edge of the light guide layer 610 and an outer end section 614 extending outwardly in the radial direction thereof and having an end face exposed at an outer circumferential edge of the light guide layer 610 are provided at both ends of the light guide path section 611 having a circular configuration. A flat portion 610b is provided at the inner circumferential edge of the light guide layer 610 facing the opening 610a in the region where the end face of the inner end 613 of said light guide path section 611 is exposed. A flat portion 610c is provided at the outer circumferential edge of the light guide layer 610 in the region where the end face of the outer end 614 of said light guide path section 611 is exposed.

Figure 19:
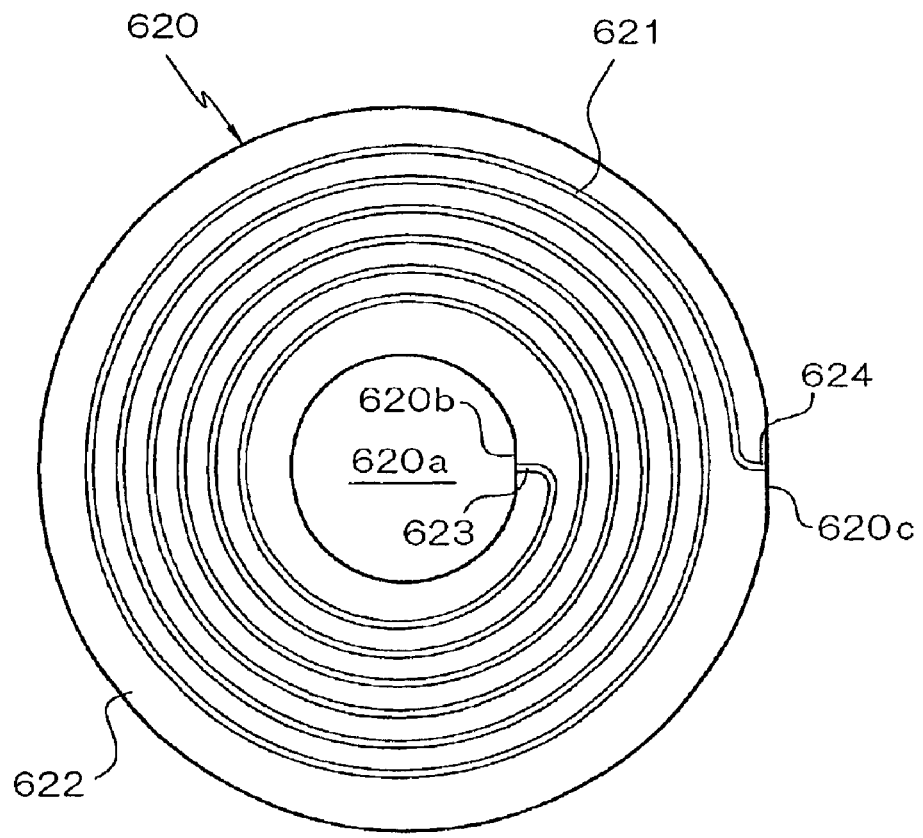
FIG. 19 is a plan view showing a structure of another light guide layer in the fifth mode for carrying out the invention.

A light guide layer 620 is constituted by a plate-like light guide body and provided with a light guide path section 621 that is formed in a circular configuration, as shown in FIG. 19. The periphery of the light guide path section 621 is protected with a protective material 622. The light guide path section 621 and the protective material 622 may be configured using the materials as described in the above modes for carrying out the invention. The light guide path section 621 is configured in the form of a helix or spiral that is wound in inward and outward directions in the plane of the same in the illustrated example. The light guide layer 620 has an annular configuration as a whole, and an opening 620a is provided in the middle of the same.

In a light guide layer 620 in the present mode for carrying out the invention, an inner end section 623 extending toward the center of the light guide layer 620 having an end face exposed at an inner circumferential edge of the light guide layer 620 and an outer end section 624 extending outwardly in the radial direction thereof and having an end face exposed at an outer circumferential edge of the light guide layer 620 are provided at both ends of the light guide path section 621 having a circular configuration. A flat portion 620*b* is provided at the inner circumferential edge of the light guide layer 620 facing the opening 620*a* in the region where the end face of the inner end 623 of said light guide path section 621 is exposed. A flat portion 620*c* is provided at the outer circumferential edge of the light guide layer 620 in the region where the end face of the outer end 624 of said light guide path section 621 is exposed.

Figure 20:
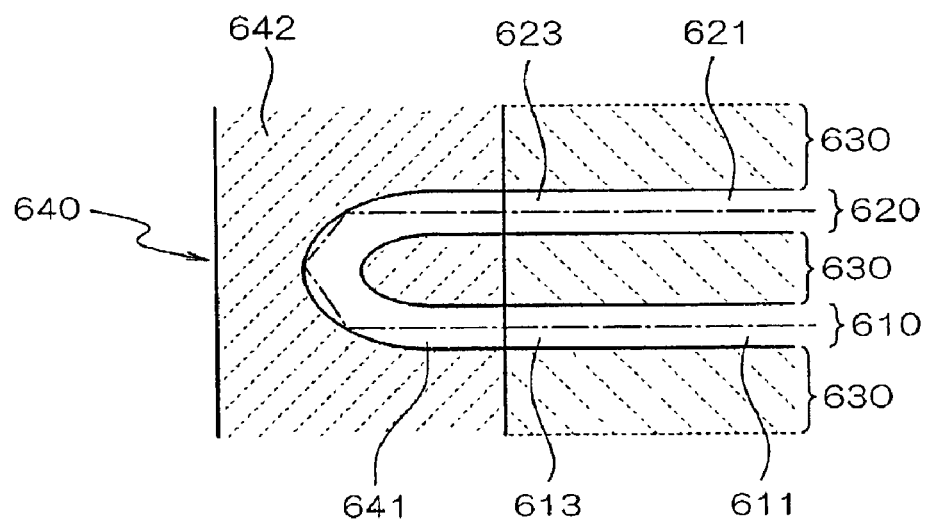
FIG. 20 is an enlarged sectional view showing a structure in the vicinity of an optical connecting section at an outer circumference in the fifth mode for carrying out the invention.
Figure 21:
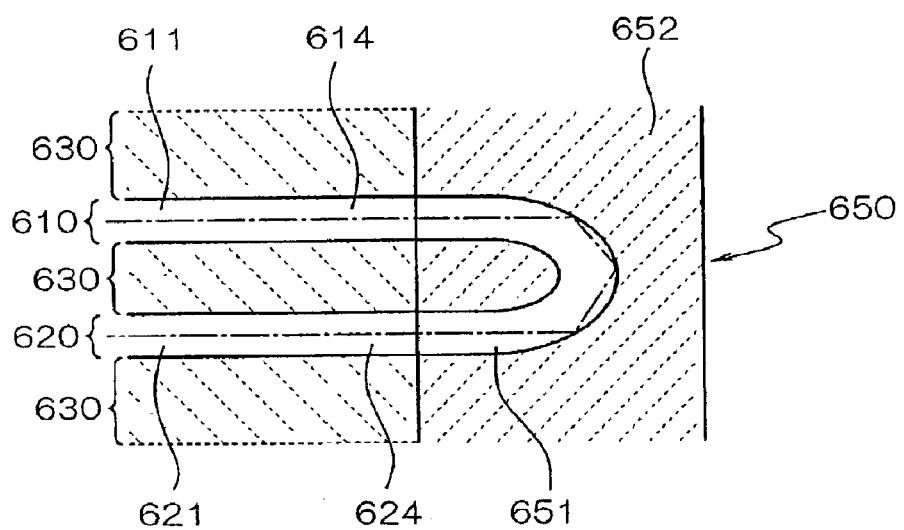
FIG. 21 is an enlarged sectional view showing a structure in the vicinity of an optical connecting section at an inner circumference in the fifth mode for carrying out the invention.

As shown in FIG. 20 and FIG. 21, said light guide layers 610 and 620 are stacked with the protective layers 630 constituted by a protective material to form a detection light guide body.

Inside the detection light guide body having such a configuration, an optical connector 640 to serve as an optical connecting section is bonded to the regions where the inner ends 613 of said light guide path sections 611 and the inner ends 623 of the light guide path sections 621 are exposed. More specifically, it is bonded to said flat portions 610*b* and 620*b* formed at the inner circumferential edges of said light guide layers 610 and 620. This makes it possible to perform positioning of the optical connecting section 640. The optical connecting section 640 is provided with light guide connecting sections 641 for connecting said inner ends 613 and inner ends 623 and protective sections 642 formed around the light guide connecting sections 641. The light guide connecting sections 641 are configured from the same material as that of said light guide path sections, and the protective sections 642 are configured from the same material as that of said protective materials and protective layers 630. The light guide connecting sections 641 of the optical connector 640 are provided in a quantity that is equal to the number of pairs of light guide layers 610 and light guide layers 620 of the detection light guide body that are adjacent to each other.

While the light guide connecting sections 641 of said optical connector 640 have a configuration that is curved in the stacking direction of the light guide layers 610 and 620, a configuration may be employed in which reflecting surfaces are provided to deflect a light path by reflection as in said third and fourth embodiments of the invention.

Outside the detection light guide body, an optical connector 650 to serve as an optical connecting section is bonded to the regions where the outer ends 614 of said light guide path sections 611 and the outer ends 624 of the light guide path sections 621 are exposed. More specifically, it is bonded to said flat portions 610*c* and 620*c* formed at the outer circumferential edges of said light guide layers 610 and 620. This makes it possible to perform positioning of the optical connecting section 650. The optical connecting section 650 is provided with light guide connecting sections 651 for connecting said outer ends 614 and outer ends 624 and protective sections 652 formed around the light guide connecting sections 651. The light guide connecting sections 651 are made from the same material as that of said light guide path sections, and the protective sections 652 are made from the same material as that of said protective materials and protective layers 630. The light guide connecting sections 651 of the optical connector 650 are provided in a quantity that is equal to the number of pairs of light guide layers 610 and light guide layers 620 of the detection light guide body that are adjacent to each other.

While the light guide connecting sections 651 of said optical connector 650 have a configuration that is curved in the stacking direction of the light guide layers 610 and 620, a configuration may be employed in which reflecting surfaces are provided to deflect a light path by reflection as in said third and fourth embodiments of the invention.

Figure 22:
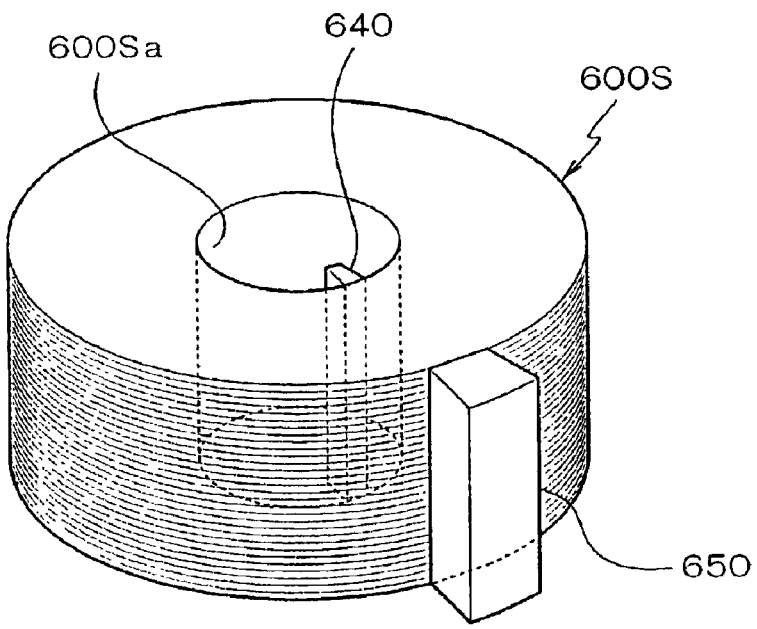
FIG. 22 is a schematic perspective view showing the appearance of a detection light guide body in the fifth mode for carrying out the invention.

FIG. 22 is a schematic perspective view schematically showing a general configuration of the detection light guide body 600S configured as described above. In the detection light guide body 600S, said optical connector 640 is contained in a through hole 600S*a* provided in the middle of the stack formed by alternately stacking said light guide layers 610 and 620 with the protective layers 630 interposed therebetween and is bonded to an inner circumferential surface of the stack. Said optical connector 650 is bonded to an outer circumferential surface of the stack.

Figure 23:
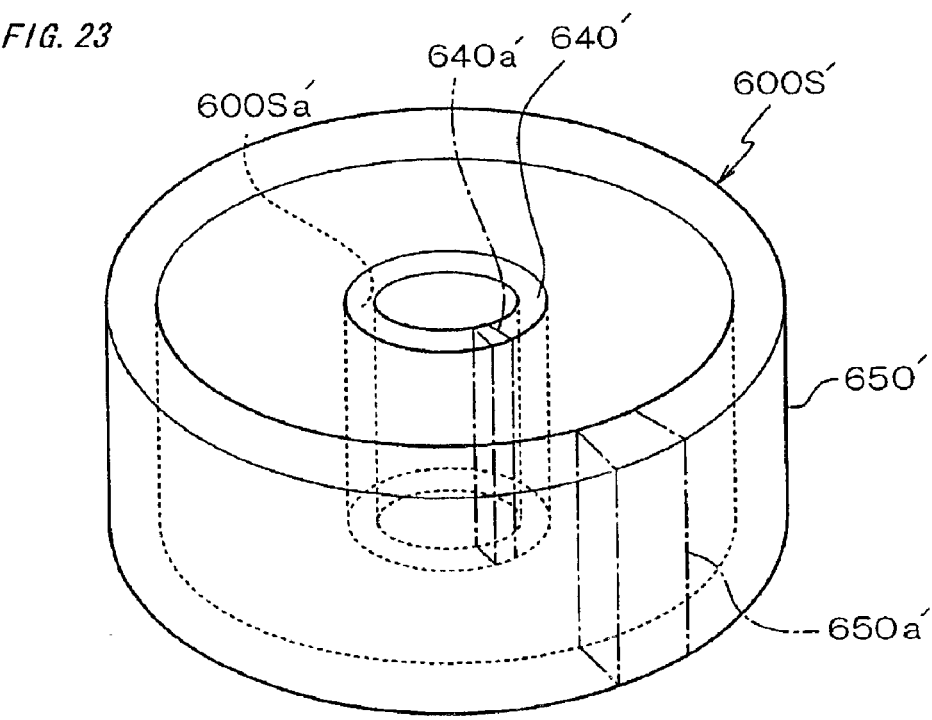
FIG. 23 is a schematic perspective view showing the appearance of a modification of the detection light guide body in the fifth mode for carrying out the invention.

FIG. 23 is a schematic perspective view schematically showing an example of configuration of a detection light guide body 600S' that is different from the detection light guide body 600S shown in FIG. 22. In the detection light guide body 600S', a cylindrical optical connector 640' is contained in a through hole 600S*a*' provided in the middle of a stack that is similar to the stack described above and is bonded to an inner circumferential surface of the stack. While the optical connector 640' has a cylindrical configuration, a columnar configuration may alternatively be employed. A cylindrical optical connector 650' is fitted to the outer circumference of the stack, and the optical connector 650' is bonded to an outer circumferential surface of the stack. A portion 640*a*' of the optical connector 640' indicated by the alternate long and short dash line in the figure and a portion 650*a*' of the optical connector 650' indicated by the alternate long and short dash line have the same structures as those of said optical connectors 640 and 650.

The optical connectors 640' and 650' are configured in shapes that match the shapes of an inner circumferential surface and an outer circumferential surface of the stack corresponding to said flat surfaces 610*b*, 610*c*, 620*b*, and 620*c* and the like, which makes it possible to perform positioning of the optical connectors 640' and 650' precisely.

In the fifth embodiment of the invention, a configuration is employed in which the optical connectors 640 and 650 are attached to the stack formed by stacking the light guide layers 610 and 620 to establish optical connection between adjoining light guide layers 610 and 620 of the stack. This simplifies the structure of each of the light guide layers 610 and 620 and makes it possible to achieve a further reduction of manufacturing cost from that achievable in each of the embodiments of the invention described above.

Although the optical connecting sections must be formed in a somewhat large size to achieve total reflection of light at an interface because no reflecting surface constituted by a surface of a metal layer is used unlike the third and fourth embodiments of the invention, optical loss itself can be reduced that encountered in the above embodiments of the invention.

[Second Method of Manufacturing Detection Light Guide Body]

Finally, a description will be made with reference to FIGS. 24 to 26 on a second method of manufacturing a detection light guide body that can be used for manufacture of an optical gyroscope of each of the above-described embodiments of the invention.

Figure 24:
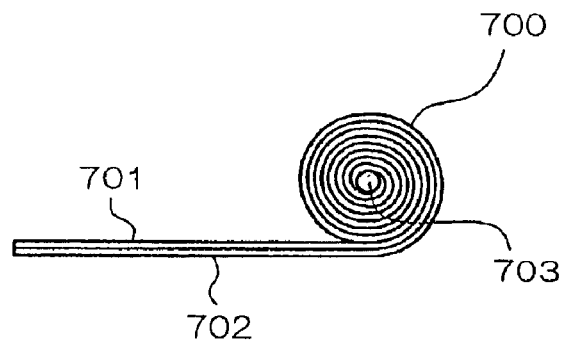
FIG. 24 is an illustration showing a step of a process of manufacturing a detection light guide body of an optical fiber scope.

In the present mode for carrying out the invention, as shown in FIG. 24, a wound body (roll body) 700 in the form of a roll cake is formed by overlapping and winding a flexible light guide sheet 701 constituted by the same material as that of the light guide path sections in each of the above-described embodiments of the invention and a flexible protective sheet 702 constituted by the same material as that of the protective materials and protective layers in each of the above-described embodiments of the invention.

In doing so, the light guide sheet 701 and the protective sheet 701 may be bonded to each other with an adhesive or tackiness agent. A configuration may be employed in which a tacky layer or adhesive layer is formed on each of the sheets in advance to bond the sheets to each other by winding them as described above. Alternatively, the sheets may be integrated using thermo-compression bonding or the like after forming said wound body 700. When openings are to be formed in the middle of light guide layers to be formed later as described in each of the above-described modes for carrying out the invention, the winding operation may be carried out with an axial or cylindrical core material 703 disposed at the center of winding. The core material 703 is removed before or after the subsequent step.

Each of said light guide sheet 701 and protective sheet 702 can be easily formed with a thickness of about 10 $\mu$m using a resin film, for example. The use of well-known laminating techniques makes it possible to form a multi-layer sheet in which a light guide film and a protective film are formed in advance. In this case, a multi-layer sheet may be used in which three or more light guide films and protective films are formed. By using a multi-layer sheet or increasing the number of layers of a multi-layer sheet, said winding operation can be easily carried out even if the thickness of each film is very small.

In any case, the thickness of the light guide layer forming a part of the wound body 700 is preferably in the range from about 1 to 1000 $\mu$m as long as a winding operation as described above can be carried out. A thickness less than 1 $\mu$m will result in a reduction in efficiency of light propagation, and a thickness in the excess of 1000 $\mu$m will result in an increase in the volume of the detection light guide body.

Figure 25:
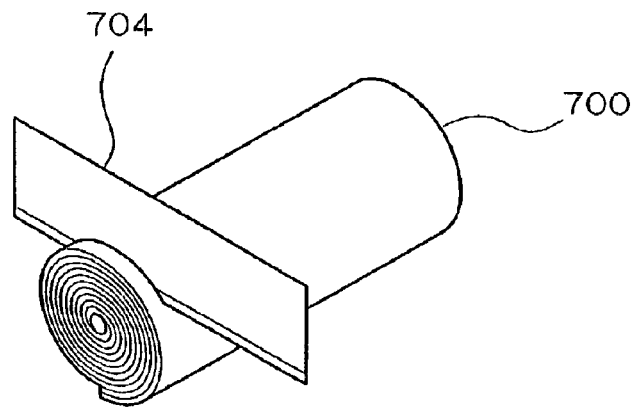
FIG. 25 is an illustration showing another step of the process of manufacturing the detection light guide body of the optical fiber scope.

Next, said wound body 700 is divided into a plurality of parts in the axial direction thereof as shown in FIG. 25. For example, the wound body 700 is sliced using a cutter 704. Thus, light guide layers 710 and 720 having a disk-like configuration are formed as shown in FIG. 26. The light guide layers 710 and 720 are respectively provided with light guide path sections 711 and 712 constituted by parts of said protective sheet 702 and protective materials 712 and 722 constituted by parts of said protective sheet 702. The wound body 700 is preferably divided in a width in the range from 1 to 1000 $\mu$m. A width less than 1 $\mu$m will result in a reduction in efficiency of light propagation, and a width in the excess of 1000 $\mu$m will result in an increase in the volume of the detection light guide body.

The light guide layers 710 and 720 have the light guide path sections 711 and 712 that are wound in directions opposite to each other. Both of the light guide layers 710 and 720 are formed by dividing said wound body 700 and can be configured by using them in opposite vertical directions. The light guide layers 710 and 720 are formed with structures to configure optical connecting sections such as inner ends and outer ends described in each of the above-described embodiments of the invention through an appropriate process. For example, the inner circumference and outer circumference of the light guide layers are cut to form inclined surfaces (e.g., surfaces that are inclined at about 45 deg to the surface of the light guide layers), and a metal such as aluminum is deposited on the inclined surfaces.

When light guide layers are formed by dividing a general wound body that substantially has a structure similar to that of said wound body 700 other than a wound body 700 formed using the method in the present mode for carrying out the invention, two types of light guide layers to be alternately stacked are formed by using the light guide layers in opposite attitudes as described above. Since this results in an accurate match between the positions of optical connecting sections of adjoining light guide layers, there is an advantage in that any reduction in yield of manufacture attributable to misalignment of optical connecting sections can be prevented.

Figure 26:
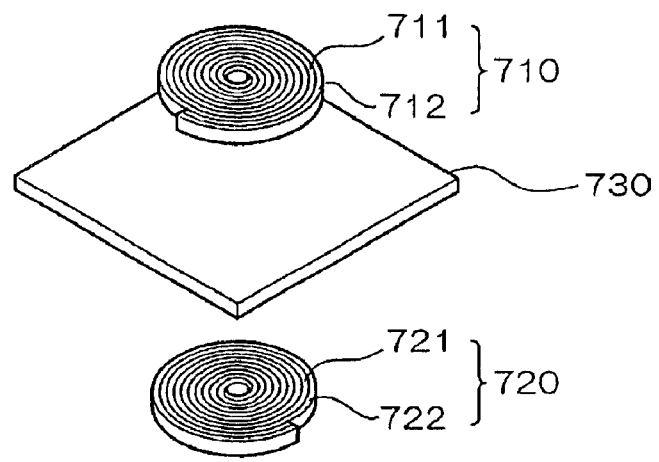
FIG. 26 is an illustration showing still another step of the process of manufacturing the detection light guide body of the optical fiber scope.

Thereafter, the light guide layers 710 and 720 are alternately stacked with protective layers 730 interposed therebetween, as shown in FIG. 26. The resultant stack as a whole may be molded using a material that is equivalent to the protective layers 730. Alternatively, the light guide layers 710 and 720 may be stacked with an unset protective material interposed therebetween. Further, when the same structure as that in the fifth embodiment of the invention is used, an optical connector is attached after forming the stack.

Optical gyroscopes according to the invention are not limited to the examples described and illustrated above, and various modifications may obviously be made without departing the principle of the present invention. For example, while a light guide path arranged in a detection light guide body is formed in a circular eddy configuration in any of the above-described embodiments of the invention, it may have a configuration in which it swirls in the form of a polygonal shape (a square or triangle) when viewed from above. The shape of the light guide path is not limited to the eddy configuration as long as it is a circular configuration (a configuration in which light travels around a predetermined part to return to a position that is relatively close to the initial position). For example, a plurality of helices having different radii may be telescopically inserted, and the plurality of helices may be series-connected with each other.

INDUSTRIAL APPLICABILITY

As described above, the present invention makes it possible to provide a compact optical gyroscope because a detection light guide body can be configured compactly.

What is claimed is:

1. An optical gyroscope having a light source, a detection light guide body having a circular light guide path, and a photo detector for detecting light that has passed through said light guide path of said detection light guide body:

said detection light guide body having a plurality of light guide layers having circular light guide path sections; and said light guide layers having said light guide path sections stacked on each other so that they are optically connected to each other through a protective layer.

2. An optical gyroscope according to claim 1, wherein said light guide path sections are configured in an eddy pattern.

3. An optical gyroscope according to claim 2, comprising:

first light guide layers having said light guide path sections extending in said eddy pattern in a predetermined rotating direction from an inner end to an outer end and second light guide layers having said light guide path sections extending in said eddy pattern in said predetermined rotating direction from the outer end to the inner end; and wherein said first light guide layers and said second light guide layers are alternately stacked.

4. An optical gyroscope according to claim 1, further comprising an optical connecting section for optically connecting said light guide path sections of said light guide layers adjacent to each other.

5. An optical gyroscope according to claim 4, wherein said optical connecting section is provided between said light guide layers adjacent to each other.

6. An optical gyroscope according to claim 4, wherein said optical connecting section is provided across outer circumferential portions or inner circumferential portions of said light guide layers adjacent to each other.

7. An optical gyroscope according to claim 4, wherein said optical connecting section includes a reflecting surface constituted by a surface of a metal layer.

8. An optical gyroscope according to claim 7, wherein, as said reflecting surface, said optical connecting section includes a first reflecting surface provided at an end of said light guide path section of one of said light guide layers and a second reflecting surface provided at an end of said light guide path section of the other of said light guide layers in a face-to-face relationship with said first reflecting surface.

9. An optical gyroscope according to claim 1, wherein the protective layer covers said light guide path.

10. An optical gyroscope according to claim 9, characterized in that said protective material is constituted by a material having a refractive index smaller than that of said light guide path.

11. An optical gyroscope having a light source, a detection light guide body having a circular light guide path, and a photo detector for detecting light that has passed through said light guide path of said detection light guide body:

said detection light guide body having a plurality of light guide layers having circular light guide path sections and protective layers including a protective material provided between a pair of said light guide layers adjacent to each other; and the adjacent pair of said light guide layers having said light guide path sections stacked on each other so that they are optically connected to each other through said protective layers.

12. An optical gyroscope according to claim 11, wherein said light guide layers have a protective material that is provided around said light guide path sections in a planar configuration.

13. An optical gyroscope according to claim 12, wherein said protective material is formed such that it completely fills up gaps between said light guide path sections.

14. An optical gyroscope according to claim 11, wherein said protective material is formed from a material which has a refractive index smaller than that of said light guide path sections.

15. An optical gyroscope according to claim 11, wherein said light guide path sections are preferably configured in an eddy pattern.

16. An optical gyroscope according to claim 15, comprising:

as said light guide layers, first light guide layers having said light guide path sections extending in an eddy pattern in a predetermined rotating direction from an inner end to an outer end thereof and second light guide layers having said light guide path sections extending in an eddy pattern in said predetermined rotating direction from an outer end to the inner end thereof; and wherein said first light guide layers and said second light guide layers are alternately stacked with said protective layers interposed therebetween.

17. An optical gyroscope according to claim 11, further comprising an optical connecting section for optically connecting said light guide path sections of said light guide layers adjacent to each other.

18. An optical gyroscope according to claim 17, wherein said optical connecting section is provided between said light guide layers adjacent to each other.

19. An optical gyroscope according to claim 17, wherein said optical connecting section is provided across outer circumferential portions or inner circumferential portions of said light guide layers adjacent to each other.

20. An optical gyroscope according to claim 17 wherein said optical connecting section includes a reflecting surface constituted by a surface of a metal layer.

21. An optical gyroscope according to claim 20, wherein, as said reflecting surface, said optical connecting section includes a first reflecting surface provided at an end of said light guide path section of one of said light guide layers and a second reflecting surface provided at an end of said light guide path section of the other of said light guide layers in a face-to-face relationship with said first reflecting surface.

22. An optical gyroscope having a light source, a detection light guide body having a circular light guide path, and a photo detector for detecting light that has passed through said light guide path of said detection light guide body:

said detection light guide body having a plurality of light guide layers having circular light guide path sections that are formed in an annular region; and said light guide layers having said light guide path sections stacked on each other so that they are optically connected to each other through a protective layer positioned between the light guide layers.

23. An optical gyroscope according to claim 22, wherein said light guide layers have an opening at the center thereof.

24. An optical gyroscope according to claim 22, wherein said light source and said photo detector are provided closer to the center than the region where said light guide path sections are formed as viewed on the plane thereof.

25. An optical gyroscope according to claim 24, further comprising an optical circuit that determines optical interactions between said light source and said photo detector and said detection light guide body.

26. An optical gyroscope according to claim 25, wherein said optical circuit is provided closer to the center than the region where said light guide path sections are formed on the plane thereof.

27. A method of manufacturing an optical gyroscope having a light source, a detection light guide body having a circular light guide path, and a photo detector for detecting light that has passed through said light guide path of said detection light guide body, the method comprising the step of forming said detection light guide body by stacking a plurality of light guide layers having circular light guide path sections on each other such that said light guide path sections are optically connected to each other through a protective material positioned between the light guide layers.

28. A method of manufacturing an optical gyroscope according to claim 27, wherein the step of forming said detection light guide body includes the step of forming said light guide path in which said light guide path sections are optically connected across a plurality of layers and the step of filling the protective material around said light guide path.

29. A method of manufacturing an optical gyroscope according to claim 28, wherein, at the step of forming said light guide path, said light guide path is formed using an optical shaping process.

30. A method of manufacturing an optical gyroscope according to claim 27, wherein the step of forming said detection light guide body includes the step of forming a plurality of said light guide layers having said light guide path sections and the step of stacking said light guide layers on each other such that said light guide path sections are optically connected to each other.

31. A method of manufacturing an optical gyroscope according to claim 30, wherein, at the step of forming said light guide layers, said light guide path sections are formed using an optical shaping process.

32. A method of manufacturing an optical gyroscope according to claim 30, wherein, at the step of forming said light guide layers, a wound body is formed by winding a light guide sheet for forming said light guide path sections and a protective sheet constituted by the protective material so that they overlap, and said light guide layers are formed by dividing said wound body in the axial direction thereof.

33. A method of manufacturing an optical gyroscope according to claim 30, wherein, at the step of stacking said light guide layers, a plurality of said light guide layers are stacked on each other with protective layers constituted by the protective material interposed therebetween.

34. A method of manufacturing an optical gyroscope according to claim 28, wherein said protective material is a material having a refractive index smaller than that of said light guide path sections.

* * * * *